(12) United States Patent
Jamila

(10) Patent No.: US 10,925,406 B2
(45) Date of Patent: Feb. 23, 2021

(54) TECHNICIAN'S WORK CHAIR

(71) Applicant: Nissan North America, Inc., Franklin, TN (US)

(72) Inventor: Mohammed Jamila, Madison, MS (US)

(73) Assignee: Nissan North America, Inc., Franklin, TN (US)

(*) Notice: Subject to any disclaimer, the term of this patent is extended or adjusted under 35 U.S.C. 154(b) by 91 days.

(21) Appl. No.: 16/147,139

(22) Filed: Sep. 28, 2018

(65) Prior Publication Data
US 2020/0100595 A1  Apr. 2, 2020

(51) Int. Cl.
A47C 9/02 (2006.01)
A47C 7/62 (2006.01)
A47C 3/12 (2006.01)
B60V 3/02 (2006.01)

(52) U.S. Cl.
CPC ........... *A47C 9/02* (2013.01); *B60V 3/025* (2013.01); *A47C 3/12* (2013.01); *A47C 7/622* (2018.08)

(58) Field of Classification Search
None
See application file for complete search history.

(56) References Cited

U.S. PATENT DOCUMENTS

| | | | |
|---|---|---|---|
| 3,295,621 A * | 1/1967 | Stram | A47C 1/06 180/124 |
| 3,347,330 A * | 10/1967 | Heathe | A47B 91/002 180/117 |
| 3,407,896 A * | 10/1968 | Billin | A61G 15/10 180/119 |
| 3,416,626 A | 12/1968 | Nagamatsu | |
| 3,613,821 A | 10/1971 | Kerr | |
| 4,815,926 A | 3/1989 | Chaffee et al. | |
| 5,379,701 A * | 1/1995 | Sumi | A47C 9/022 104/89 |
| 5,720,517 A * | 2/1998 | Prothro, Sr. | A47C 7/503 297/19 |
| 6,406,095 B1 * | 6/2002 | Bouchard | A47C 3/0255 297/270.1 |
| 6,762,681 B1 * | 7/2004 | Danelski | B65G 1/137 340/568.1 |
| 7,146,660 B2 | 12/2006 | Heimbrock | |

(Continued)

OTHER PUBLICATIONS

Ultra-Simple Hovercraft, http://amasci.com/amateur/hovercft.html (1997).

(Continued)

*Primary Examiner* — David R Dunn
*Assistant Examiner* — Christopher E Veraa
(74) *Attorney, Agent, or Firm* — Global IP Counselors, LLP

(57) ABSTRACT

A technician's work chair includes a frame, first, second and third air cushion devices, a seat assembly and an electronic task guiding system. The seal assembly has a cushion portion and a seatback portion. The cushion portion is supported to the seat supporting portion of the frame. The seatback portion has an inclination adjusting mechanism operable to change an angle of inclination of the seatback portion relative to the frame. The electronic task guiding system is supported to the frame, the electronic task guiding system being configured to provide the technician with task related signals.

20 Claims, 15 Drawing Sheets

(56) References Cited

U.S. PATENT DOCUMENTS

| | | | | |
|---|---|---|---|---|
| 9,033,088 B2* | 5/2015 | Salek | ................... | B60N 2/00 |
| | | | | 180/168 |
| 2007/0235960 A1* | 10/2007 | Pantaleoni | ............... | B25H 5/00 |
| | | | | 280/32.6 |
| 2008/0183327 A1* | 7/2008 | Danelski | ................ | B65G 1/137 |
| | | | | 700/216 |
| 2009/0094028 A1* | 4/2009 | Schmidt | .................. | G10L 15/26 |
| | | | | 704/235 |
| 2009/0106227 A1* | 4/2009 | Davis | ..................... | G06Q 10/06 |
| 2009/0184482 A1* | 7/2009 | Scott | ........................ | B25H 5/00 |
| | | | | 280/32.6 |
| 2013/0020774 A1* | 1/2013 | Brittingham | ............. | B25H 5/00 |
| | | | | 280/32.6 |
| 2017/0232608 A1* | 8/2017 | Coutts | ..................... | B25H 5/00 |
| | | | | 362/486 |

OTHER PUBLICATIONS

Experience the Safest and Easiest Method of Moving Heavy Machines, http://amasci.com/amateur/hovercft.html, Jun. 2012.

* cited by examiner

US 10,925,406 B2

1

TECHNICIAN'S WORK CHAIR

BACKGROUND

Field of the Invention

The present invention generally relates to technician's work chair. More specifically, tile present invention relates to technician's work chair provided with an air cushion assembly that creates an air boundary between the air cushion assembly of the technician's work chair and a floor surface beneath the technician's work chair, thereby allowing the technician's work chair to glide along the floor surface with little or no friction therebetween.

Background Information

In a vehicle assembly line, various parts and fasteners must be installed to create a vehicle. Working on an underside of the vehicle can be challenging because a technician must raise his arms above his or her head to do such work. Further, the technician must tilt his or her neck back at times. Such working conditions are uncomfortable for the technician over long periods of time.

SUMMARY

One object is to provide a technician's work chair with ergonomic features and structure that allows freedom of movement while installing parts and fasteners to an underside of a vehicle within a vehicle assembly line of an assembly plant.

Another object is to provide a technician's work chair with a task monitoring system to assist a technician in keeping track of tasks completed and tasked to be completed during the process of assembling of a vehicle in the vehicle assembly line.

In view of the state of the known technology, one aspect of the present disclosure is to provide a technician's work chair with a frame, a first air cushion device, a second air cushion device, a third air cushion device, a seat assembly and an electronic task guiding system. The frame having a first forward leg portion, a second forward leg portion and a rearward leg portion. The frame further has a seat supporting portion located proximate the rearward leg portion, a tool supporting portion and a hardware supporting portion installed to the frame proximate one of the first forward leg portion or the second forward leg portion. The first air cushion device is attached to the first forward leg portion proximate a distal end thereof. The second air cushion device attached to the second forward leg portion proximate a distal end thereof. The third air cushion device is attached to the rearward leg portion proximate a distal end thereof, each of the first air cushion device, the second an cushion device and the third air cushion device being supplied with compressed air. The seat assembly has a cushion portion and a seatback portion. The cushion portion is supported to the seat supporting portion of the frame. The seatback portion has an inclination adjusting mechanism operable to change an angle of inclination of the seatback portion relative to the frame such that a technician seated in the seat assembly ergonomically operates tools and completes tasks with arms raised over the technician's head. The seat assembly and the frame are positioned such that a forward most portion of the cushion portion is located rearward of the first forward leg portion and the second forward leg portion. The cushion portion is cantilevered in a forward direction from the seat

2 supporting portion of the frame. The electronic task guiding system is supported to the frame. The electronic task guiding system is configured to provide the technician with task related signals.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
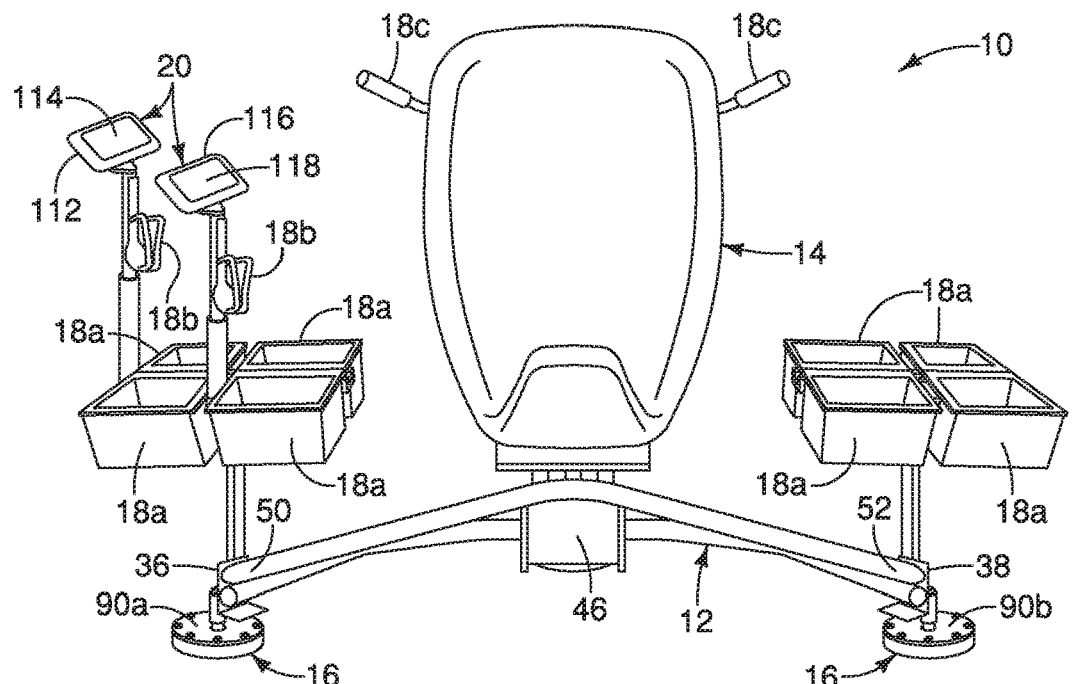
FIG. 1 is a front view of a technician's work chair having a frame, a seat assembly, an air cushion assembly, hardware bins, tool holders an electronic task guiding system, an air distribution system, an air supply hose and a hose support device in accordance with a first embodiment.

Referring initially to FIG. 1, a technician's work chair 10 is illustrated in accordance with a first embodiment.

Figure 19:
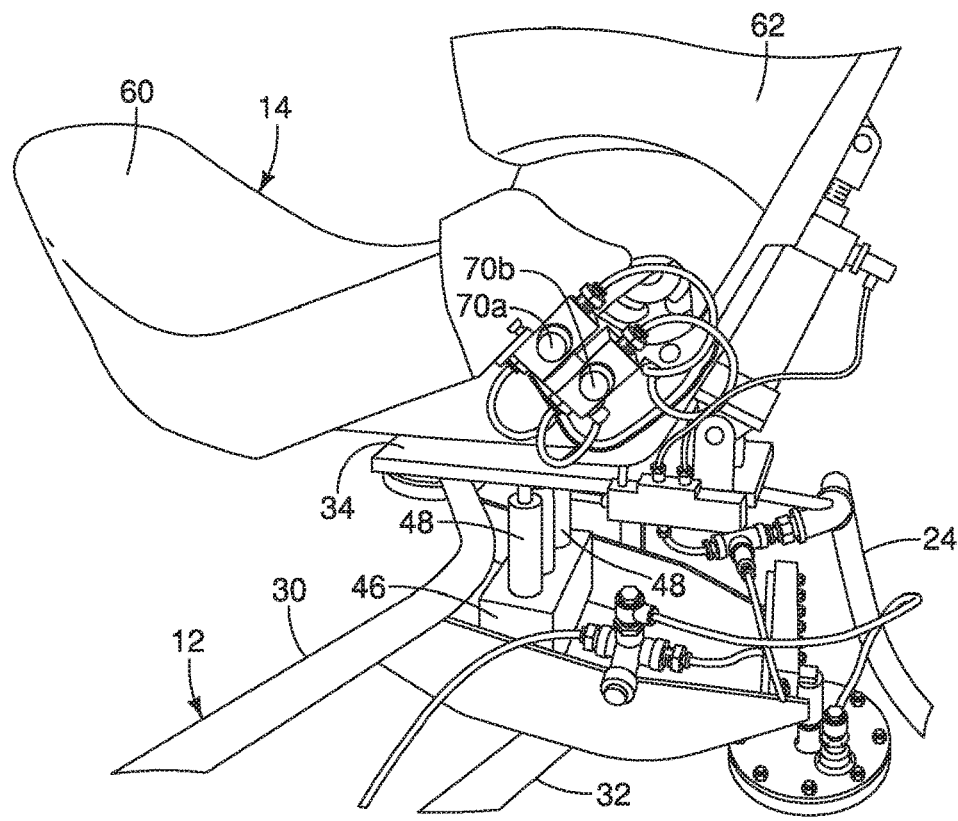
FIG. 19 is a perspective view of one side of the fully assembled technician's work chair showing portions of the air distribution system and switches that control height positioning of the cushion portion of the seat assembly in accordance with the first embodiment.

The technician's work chair 10 is designed and configured for use in, for example, an automotive assembly line environment (shown in FIG. 19) where a technician T performs assembly related tasks to an underside U of a vehicle V, as shown in FIG. 19.

Figure 2:
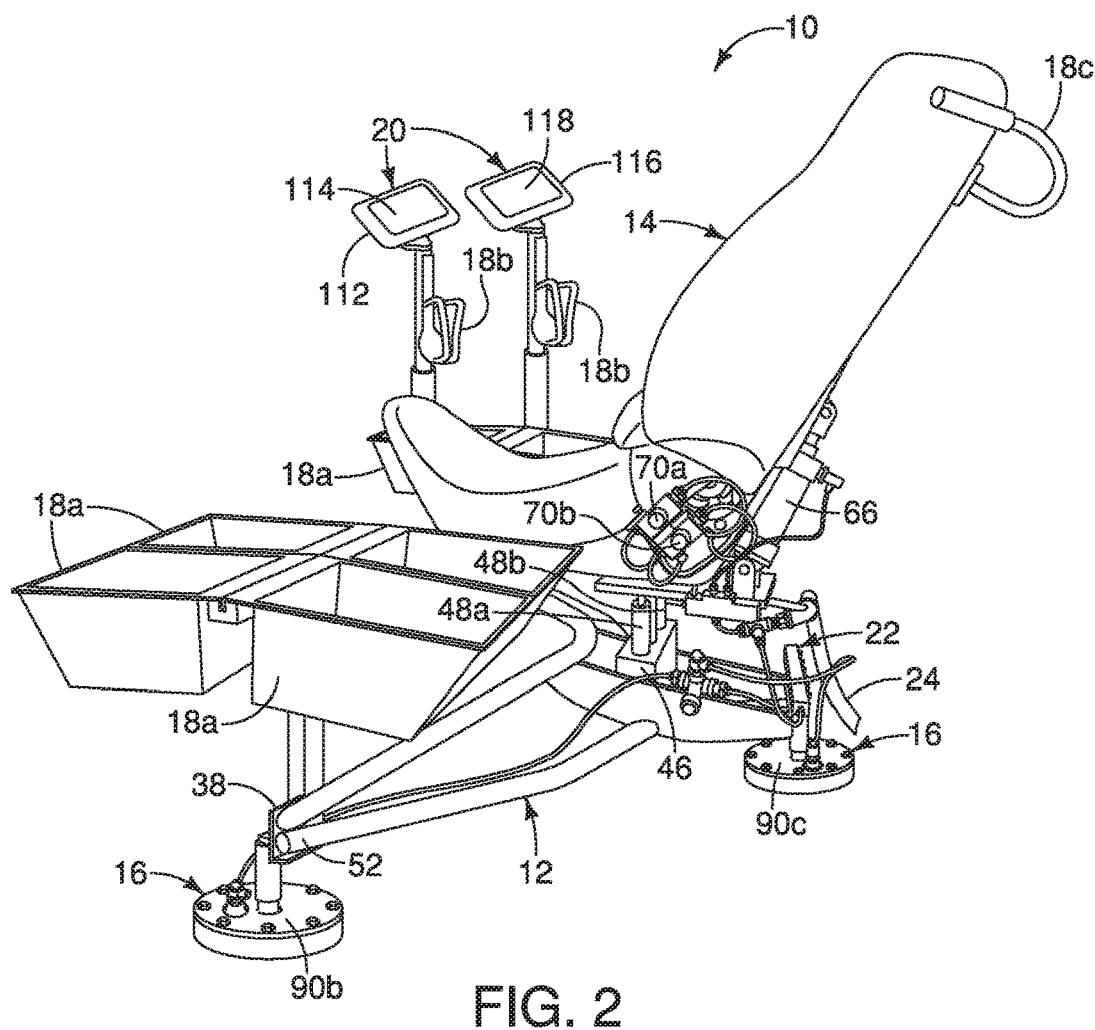
FIG. 2 is a side view of the technician's work chair showing aspects of the frame, the seat assembly, the air cushion assembly 16, the hardware bins, the tool holders the electronic task guiding system, the air distribution system, the air supply hose and the hose support device in accordance with the first embodiment.
Figure 23:
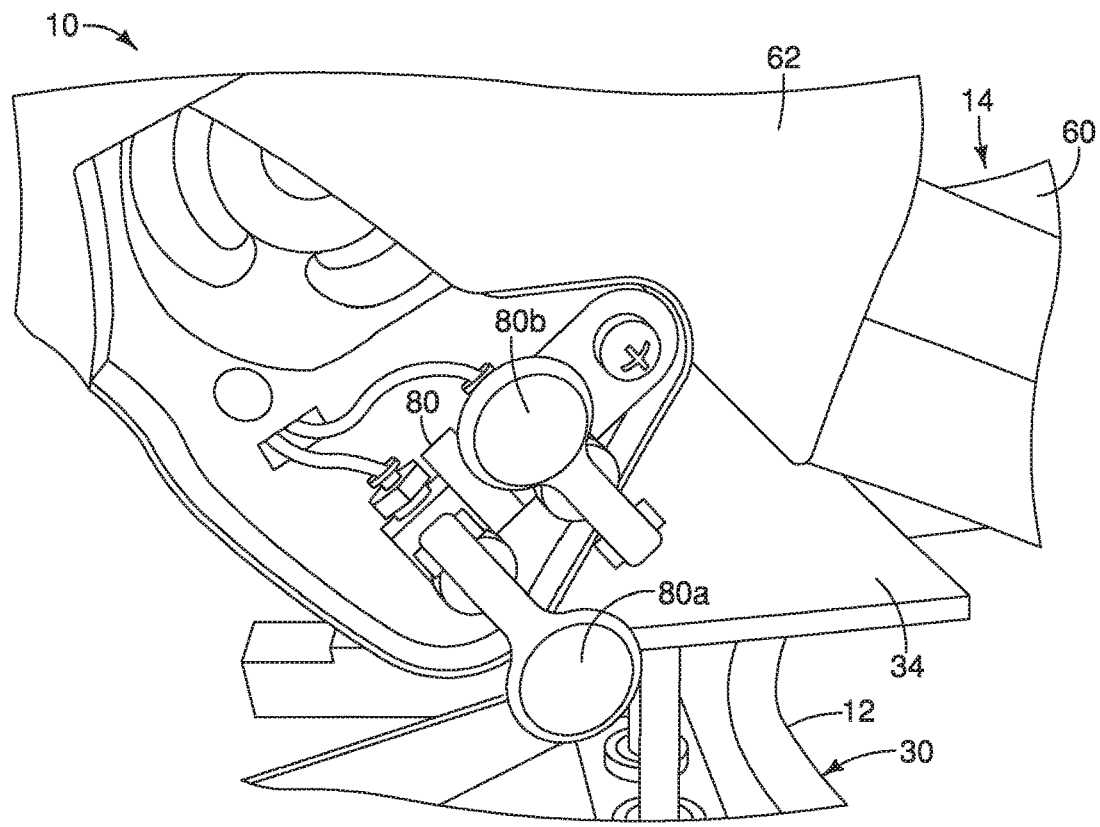
FIG. 23 is a perspective view of a portion of the other lateral side of the technician's work chair showing details of the switches that control angle of inclination of the seatback portion of the seat assembly in accordance with the first embodiment.
Figure 24:
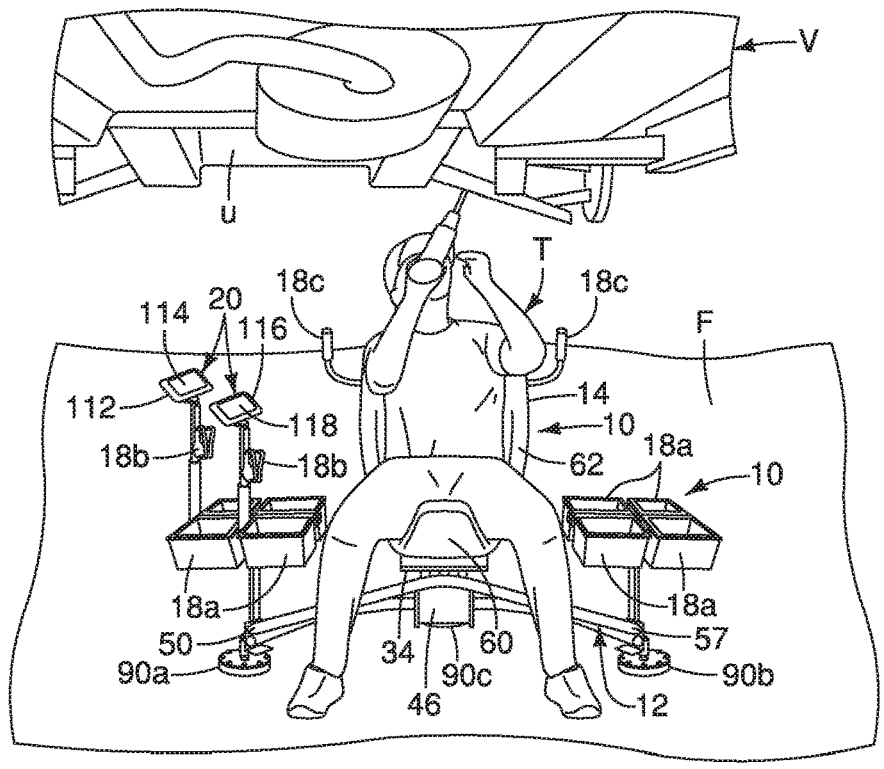
FIG. 24 is a front view of the technician's work chair being operated under a vehicle being assembled along an assembly line within a vehicle assembly plant, showing a technician using the tools to install a part and fasters to an underside of the vehicle in accordance with the first embodiment.

As shown in FIGS. 1 and 2, the technician's work chair 10 basically includes a frame 12, a seat assembly 14, an air cushion assembly 16, hardware retaining structures 18a, tool holders 18b, an electronic task guiding system 20, an air supply distribution system 22, an air supply hose 24 (also referred to as the air hones 24), and a hose support device 26 (FIGS. 23 and 24).

Figure 3:
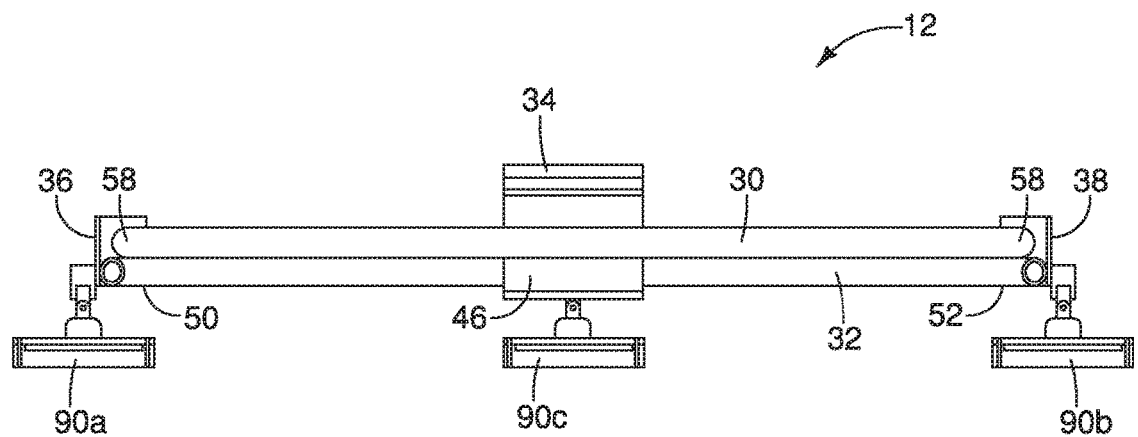
FIG. 3 is a schematic front view of the technician's work chair showing a representation of the frame and the air cushion assemblies with the seat assembly, the hardware bins, the tool holders the electronic task guiding system, the air distribution system, the air supply hose and the hose support device removed for the sake of clarity in accordance with the first embodiment.
Figure 4:
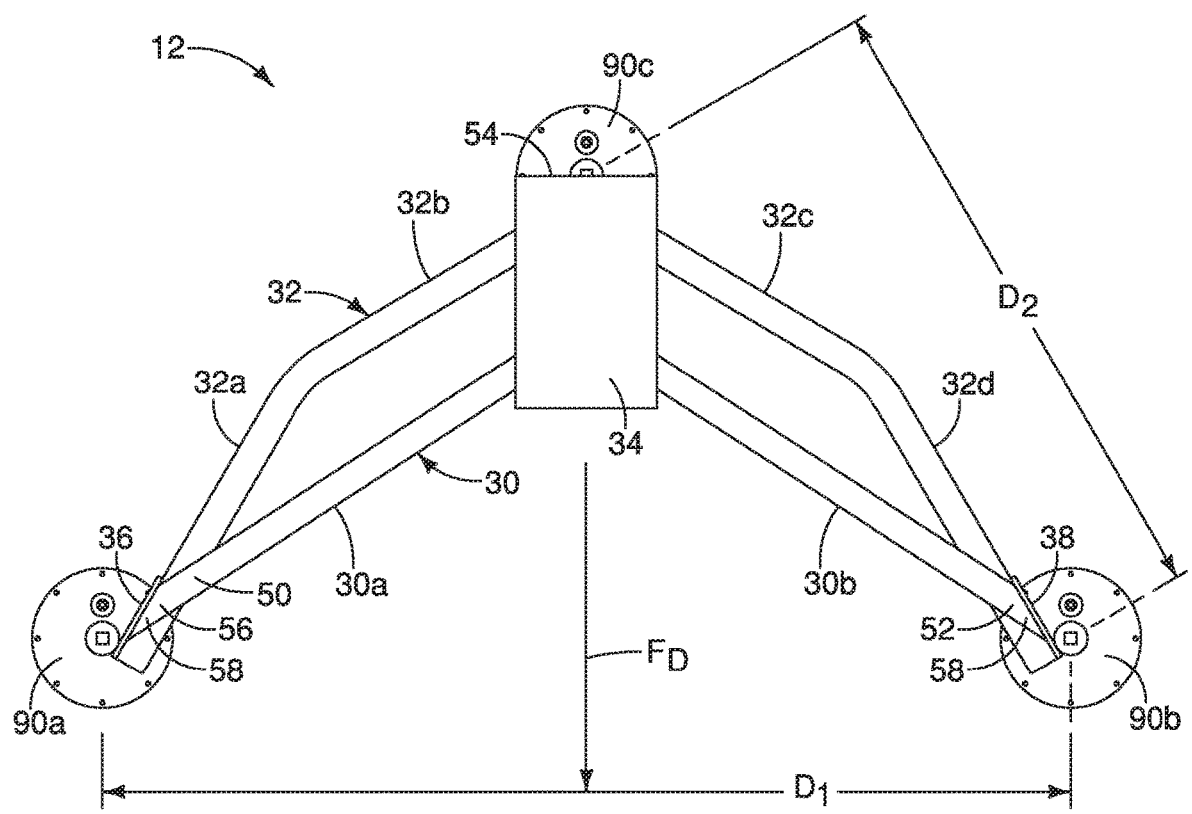
FIG. 4 is a schematic top view of the technician's work chair showing the frame and the air cushion assemblies with the seat assembly, the hardware bins, the tool holders the electronic task guiding system, the air distribution system, the air supply hose and the hose support device removed for the sake of clarity in accordance with the first embodiment.
Figure 5:
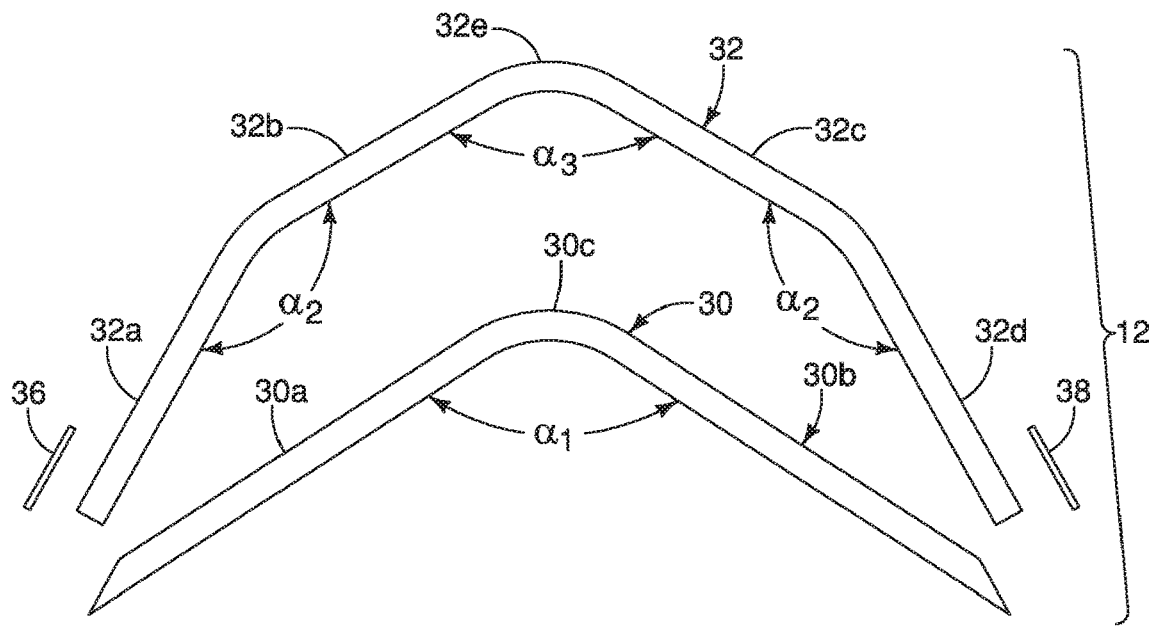
FIG. 5 is a top exploded view of two beam portions of the frame in accordance with the first embodiment.
Figure 6:
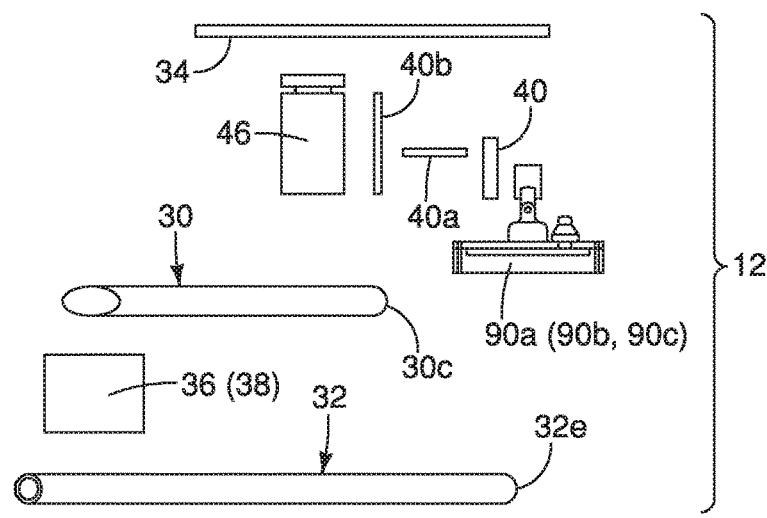
FIG. 6 is a side exploded view of all the various elements of the frame in accordance with the first embodiment.
Figure 7:
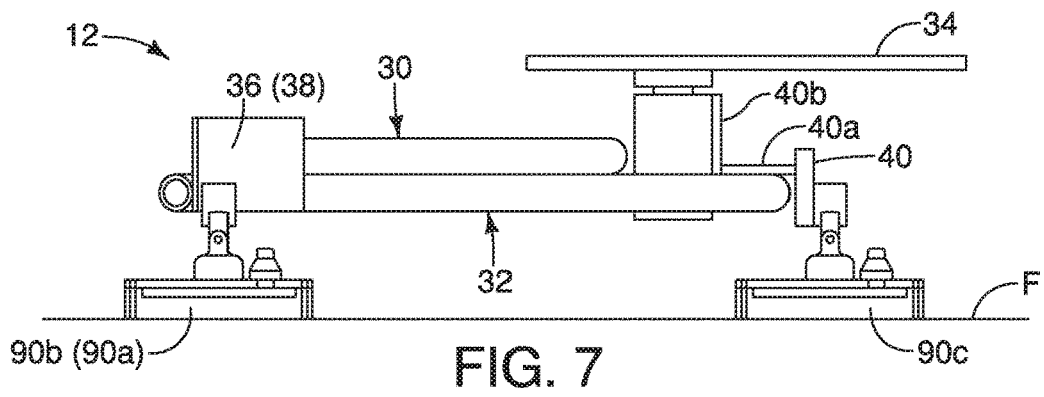
FIG. 7 is a side view of the frame shown assembled with the air cushion assemblies attached thereto without the seat assembly, the hardware bins, the tool holders the electronic task guiding system, the air distribution system, the air supply hose and the hose support device in accordance with the first embodiment.

A description of the frame 12 is now provided, with specific reference to schematic FIGS. 3-9, which show tile basic elements of the frame 12 with many of the other features of the technician's work chair 10 removed for clarity. The frame 10 basically includes a first support beam 30, a second support beam 32, a central plate 34, and end plates 36, 38 and 40, all fixed to one another as shown in FIGS. 3, 4 and 7. The first support beam 30, the second support beam 32, the central plate 34 and the end plates 36, 38 and 40, are all made of steel, iron based materials or any appropriate metal or metal alloy that is weldable and provides an appropriate level of rigidity and strength to the overall structure of the technician's work chair 10.

As shown in FIG. 5, the first support beam 30 has a first leg 30a and a second leg 30b that define an overall V-shape as viewed from above. The first leg 30a and the second leg 30b of the first support beam 30 define an obtuse angle $\alpha_1$ that is greater than 100 degrees. In the depicted embodiment, the angle $\alpha_1$ can be any value between 100 and 130 degrees.

However, in the depicted embodiment the obtuse angle $\alpha_1$ is 115 degrees. The first leg 30a and the second leg 30b are formed as a single unitary monolithic beam that is bent or worked to form the overall V-shape.

As is also shown in FIG. 5, the second support beam 32 has an overall U-shape as viewed from above that includes a first leg portion 32a, a second leg portion 32b, a third leg portion 32c and a fourth leg portion 32d, all formed together as a single unitary monolithic beam that is bent or worked to form the angles between the first, second, third and fourth leg portions 32a, 32b, 32c and 32d. The first leg portion 32a and the second leg portion 32b define an angle $\alpha_2$ therebetween that is between 140 and 160 degrees. In the depicted embodiment, the angle $\alpha_2$ is 150 degrees. The third leg portion 32c and the fourth leg portion 32d also define the angle $\alpha_2$ therebetween. The second leg portion 32b and the third leg portion 32c define an angle $\alpha_3$ therebetween that is between 110 and 130 degrees. In the depicted embodiment, the angle $\alpha_2$ is 120 degrees.

As shown in FIGS. 3, 4 and 7, the first support beam 30 is welded to the second support beam 32 at distal ends thereof. However, the first support beam 30 is positioned adjacent to and above the second support beam 32. Corresponding distal ends of the first support beam 30 and the second support beam 32 welded to the end plates 36 and 38. More specifically, the distal end of the first leg 30a of the first support beam 30 and the distal end of the first leg portion 32a of the second support beam 32 are welded to the end plate 36. Similarly, the distal end of the second leg 30b of the first support beam 30 and the distal end of the fourth leg portion 32d of the second support beam 32 are welded to the end plate 38. However, as shown in FIG. 4, a small segment of the distal end of the first leg portion 32a of the second support beam 32 extends forward of the distal end of the first leg 30a of the first support beam 30, and, a small segment of the distal end of the fourth leg portion 32d of the second support beam 32 extends forward of the distal end of the second leg 30b of the first support beam 30. A forward direction $F_D$ relative to the technician's work chair 10 and the frame 12 is shown in FIG. 4.

As shown in FIG. 7, a rearward end 30c (a central section) of the first support beam 30 and a rearward end 32e (a central section) of the second support beam 32 are spaced apart from one another. As shown in FIGS. 6 and 7, the end plate 40, along with plates 40a and 40b, are welded to one another and to the rearward end of the second support beam 32. The end plate 40 is vertically oriented. The plates 40a and 40b bridge at least a portion of a gap between the rearward end 30c of the first support beam 30 and the rearward end 32e of the second support beam 32.

As shown in FIGS. 3, 6 and 7, a housing 44 of a pneumatic mechanism 46 is welded or otherwise mechanically attached to the rearward end 30c of the first support beam 30 and an upper surface of the rearward end 32e of the second support beam 32. The pneumatic mechanism 46 is also supported by the plate 40b. Pneumatically operated pistons 48 installed to the housing 44 of the pneumatic mechanism 46 have upper ends that are fixed to the central plate 34 such that the central plate 34 (and the seat assembly 14) can be moved vertically relative to the frame 12 to any of a plurality of vertical positions. The pneumatic mechanism 46 is part of the seat assembly 14 and is described in greater detail below.

As shown in FIG. 4, distal ends of the first support beam 30 and the second support beam 32 define respective ones of a first forward leg portion 50 and a second forward leg portion 52 of the frame 12. The end plate 40 and the rearward end 32e of the second support beam 32 of the frame 12 define a rearward leg portion 54 of the frame 12. The pneumatic mechanism 46 and the central plate 34 defining a seat supporting portion of the frame 12.

As shown in FIG. 4, the first leg 30a of the first support beam 30 and the first leg portion 32a of the second support beam 32 define a tool supporting portion 56 and one of two hardware supporting portions 58. The second leg 30b of the first support beam 30 and the fourth leg portion 32d of the second support beam 32 define a second one of the two hardware supporting portions 58.

The seat supporting portion defined by the pneumatic mechanism 46 and the central plate 34 is located proximate the rearward leg portion 54.

A description of the seat assembly 14 is now provided with specific reference to FIGS. 1, 2 and 8-12, FIGS. 1 and 2 includes switches, air lines and other features installed to the technician's work chair 10. FIGS. 8-12 show the technician's work chair 10 with the seat assembly 14 with many other features removed from the frame 12 for clarity.

Figure 8:
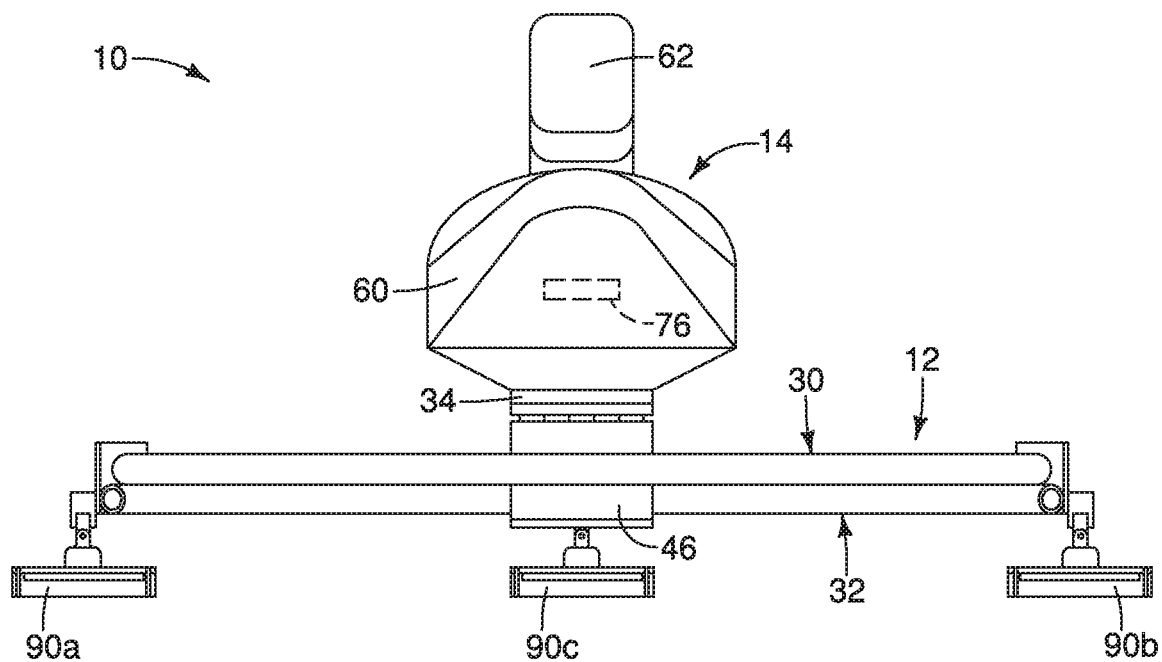
FIG. 8 is a front view of the technician's work chair showing the frame, the air cushion assemblies, a hydraulic mechanism for raising and lowering the seat assembly, a cushion portion and a seatback portion of the seat assembly installed to the frame, with the seatback portion of the seat assembly shown schematically (narrowed) for the sake of clarity in accordance with the first embodiment.
Figure 9:
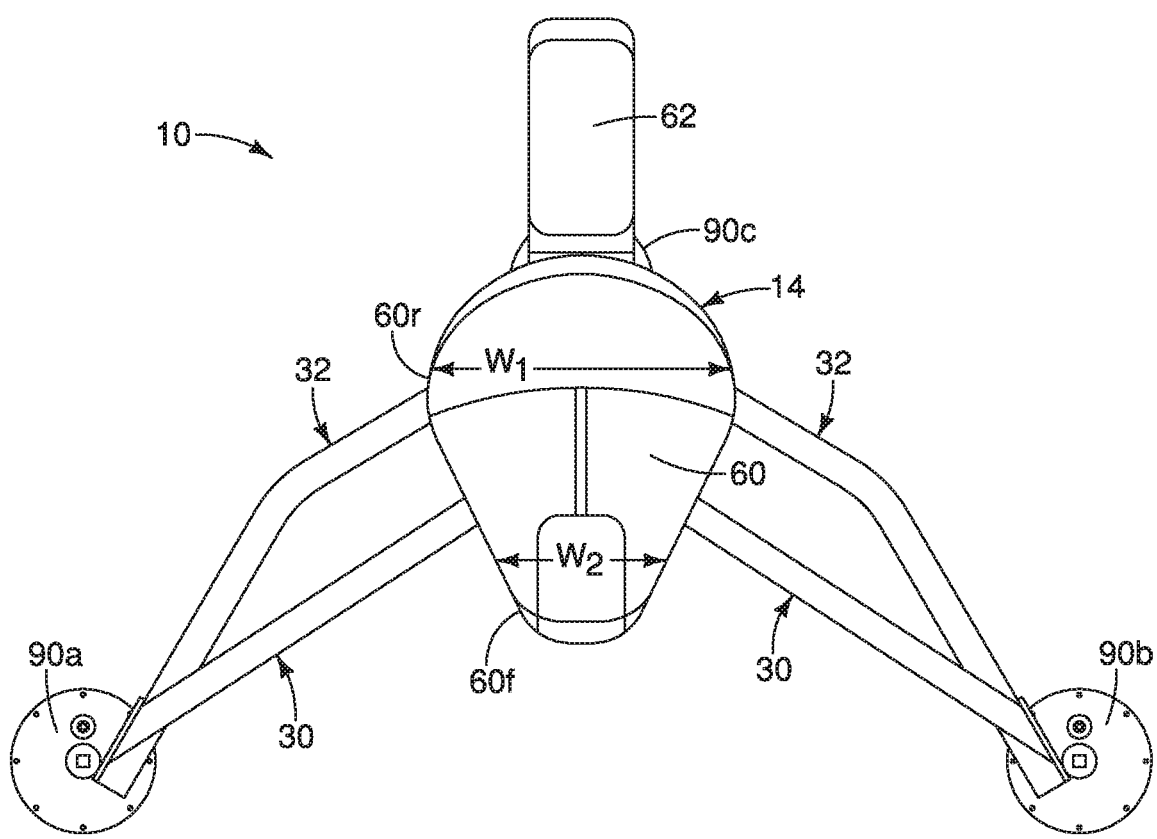
FIG. 9 is a top view of the technician's work chair showing the frame, the air cushion assemblies and the seat assembly installed to the frame, in accordance with the first embodiment.
Figure 10:
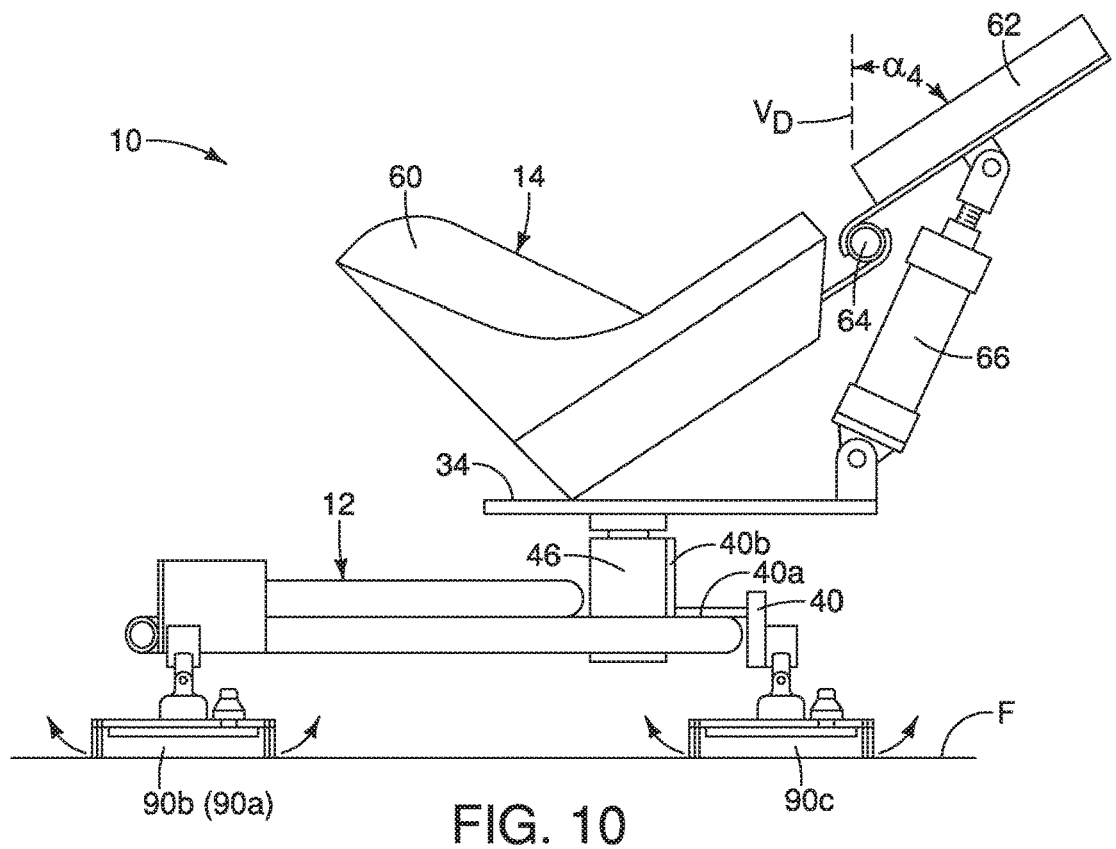
FIG. 10 is a side view of the technician's work chair showing the frame, the air cushion assemblies, the hydraulic mechanism in a lowered position, the seat cushion portion, the seatback portion and a hydraulic cylinder supporting, the seatback portion in a lower inclined orientation in accordance with the first embodiment.
Figure 11:
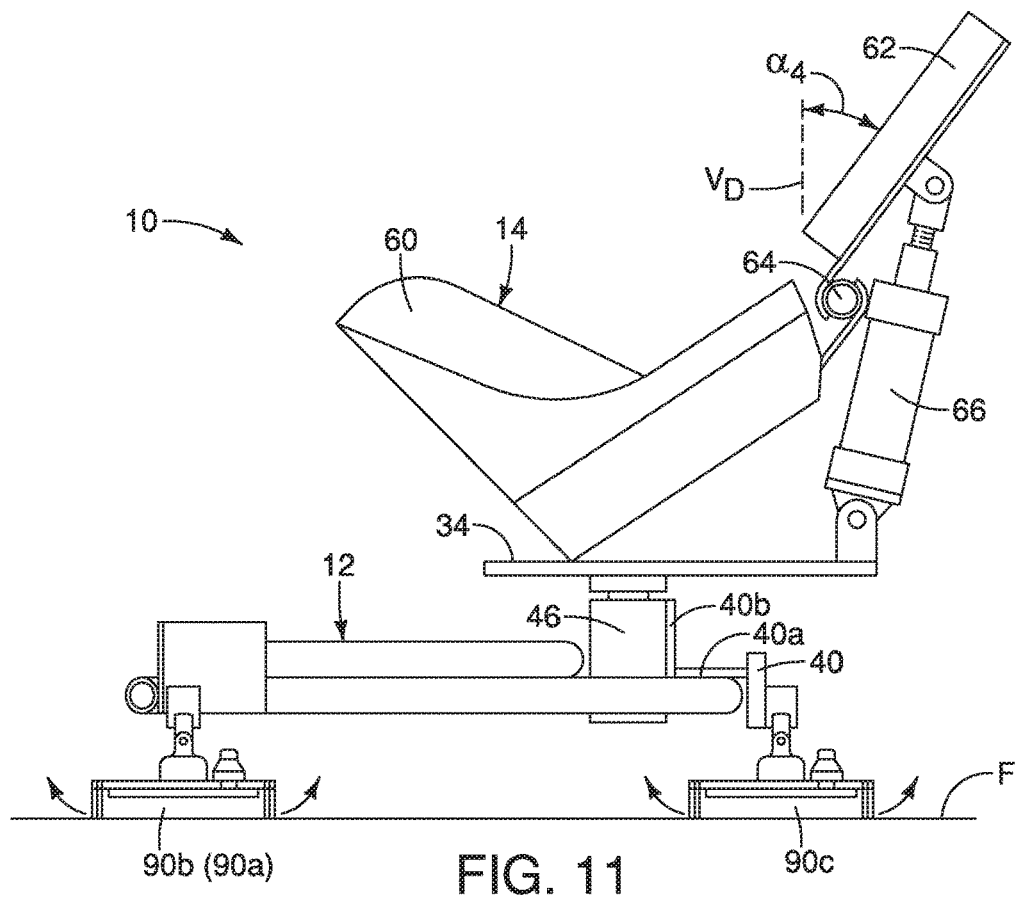
FIG. 11 is another side view of the technician's work chair showing the hydraulic mechanism in a lowered position and the hydraulic cylinder supporting the seatback portion in a raised inclined orientation in accordance with the first embodiment.

As shown in FIGS. 8-12, the seat assembly 14 includes the pneumatic mechanism 46, a cushion portion 60, a seatback portion 62, a hinge structure 64 (FIGS. 10 and 11) and a pneumatic cylinder 66 (FIGS. 10 and 11).

Figure 12:
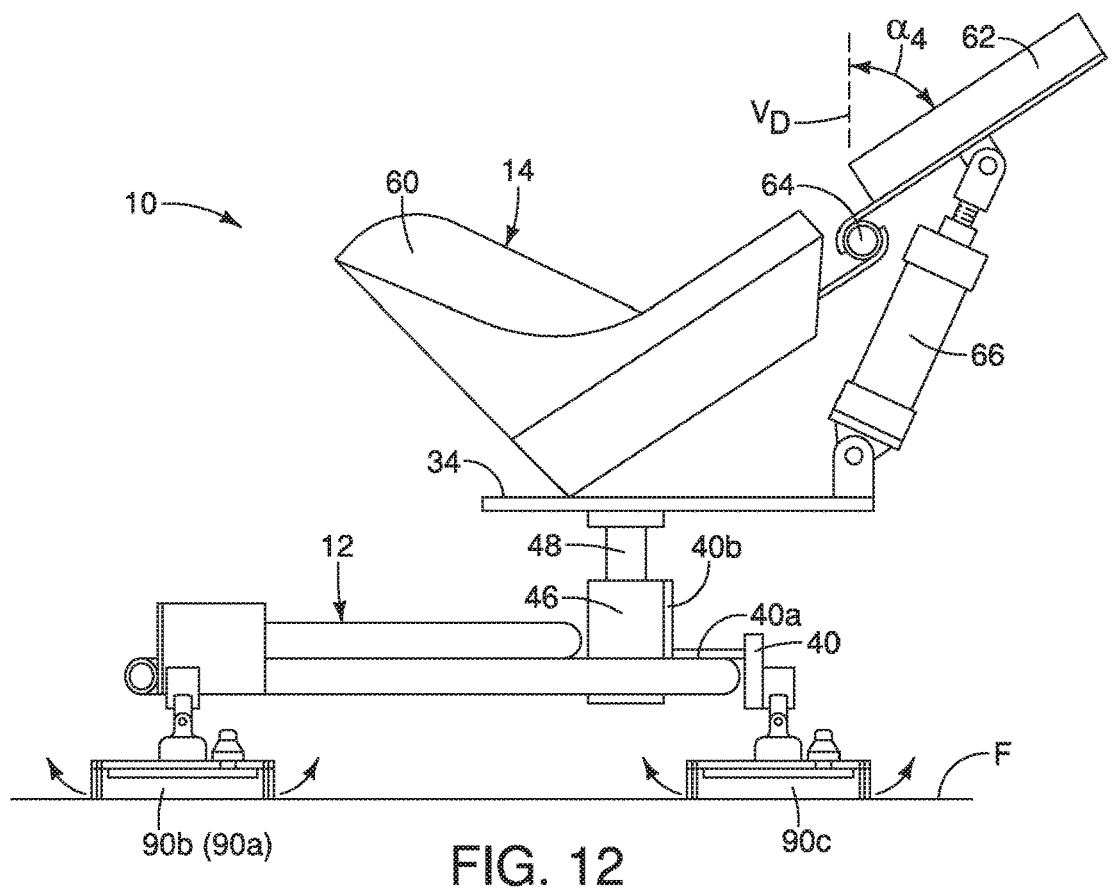
FIG. 12 is yet another sideview of the technician's work chair showing the hydraulic mechanism in a raised position such that the seat cushion portion is in an elevated position relative to the depictions in FIGS. 10 and 11, and the hydraulic cylinder supporting the seatback portion in a lowered inclined orientation in accordance with the first embodiment.
Figure 13:
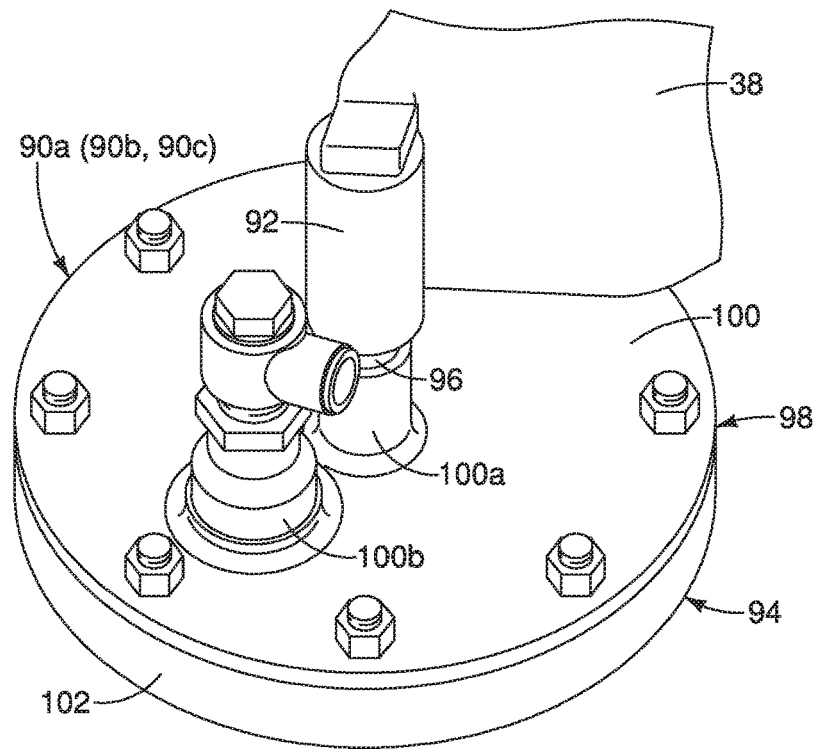
FIG. 13 is a perspective view of one of the air cushion assemblies showing an upper portion supported to a front leg of the frame and an air-line receiving fitting in accordance with the first embodiment.

The pneumatic mechanism 46 is fixed to the frame 12, as described above. Specifically, the housing 44 of the pneumatic mechanism 46 includes at least two pneumatically operated pistons 48 with distal ends thereof being rigidly fixed to the central plate 34. Consequently the central plate 34 can be positioned at any of a plurality of vertical positions relative the frame 12. More specifically, the cushion portion 60 is fixed to the central plate 34 for vertical positioning therewith. FIG. 11 depicts the cushion portion 60 at a lowermost position and FIG. 12 depicts the cushion portion 60 at a raised position, higher than the lowermost position depicted in FIG. 11. The cushion portion 60 can be bolted to the central plate 34, or, can include a tilting mechanism (not shown) that can change and angle of inclination of the cushion portion 60 relative to the central plate 34. In FIGS. 10-12, the cushion portion 60 is shown schematically in an inclined portion, such that a technician seated on the cushion portion 60 can sit in an rearwardly inclined orientation. However, in FIGS. 1, 2, the cushion portion 60 is shown in a non-inclined position.

The seal assembly 14 and the frame 12 are positioned relative to one another such that a forward most portion of the cushion portion 60 is located rearward of the first forward leg portion 50 and the second forward leg portion 52. Further, the forward most portion of the cushion portion 60 is cantilevered in a forward direction from the central plate 34 (the seat supporting portion) of the frame 12.

As shown in FIG. 9, the cushion portion 60 of the seat assembly 14 is a saddle style seat or motorcycle seat with a rear section 60r and a forward section 60f. The rear section 60r has a first width $W_1$ and the forward section 60f has a second width $W_2$. The first width $W_1$ is greater than the second width $W_2$. The forward section 60f of the seat assembly 14 is cantilevered forward from the seat supporting portion (the central plate 34 and the pneumatic mechanism 46) of the frame 12.

Figure 20:
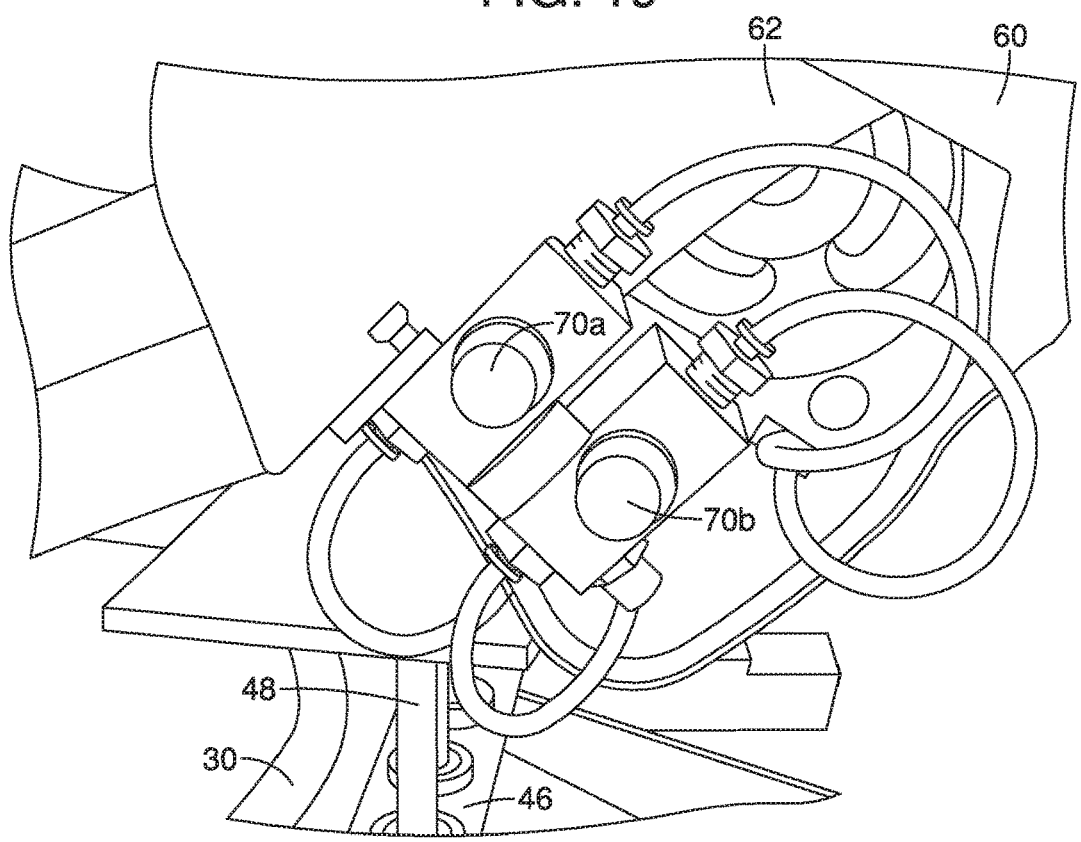
FIG. 20 is another perspective view of a portion of the one lateral side of the technician's work chair showing details of the switches that control height positioning of the cushion portion of the seal assembly in accordance with the first embodiment.

As shown in FIG. 19 and 20, the seat assembly 14 includes a pair of pneumatic switches the cushion portion of the seat assembly is supported to the seat supporting portion of the frame via a pneumatic mechanism that is operated for height adjustment of the cushion portion by mechanical switches that control amounts of compressed air from a compressed air source.

Figure 25:
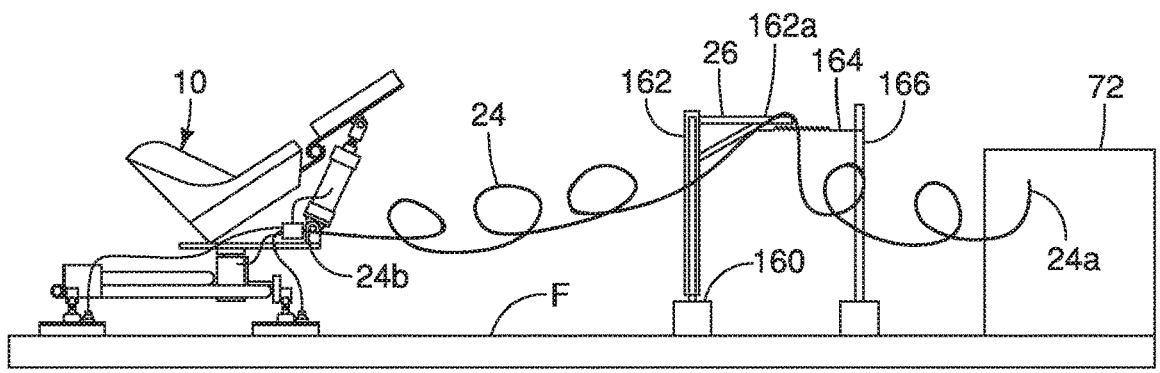
FIG. 25 is a schematic side view of a portion of the assembly line with the technician's work chair located on a floor surface of the assembly line, the air supply hose extending from the technician's work chair to a compressed air source, and with a central portion of the air supply hose being supported by a hose support device that is biased to urge the air hose rearward of the technician's work chair in accordance with the first embodiment.
Figure 26:
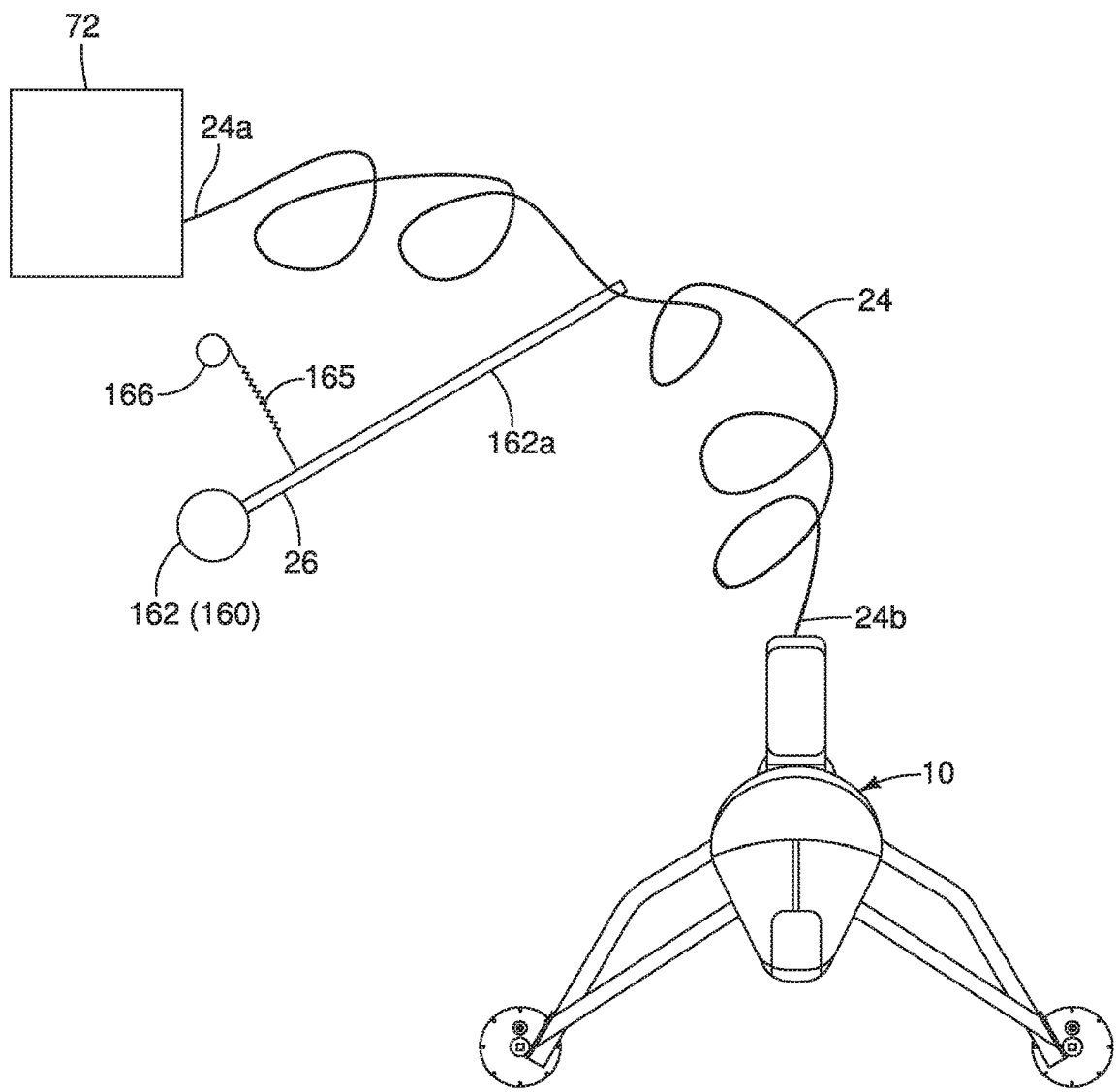
FIG. 26 is a schematic top view of the portion of the assembly line depicted in FIG. 25, with the technician's work chair located on the floor surface of the assembly line, the air supply hose extending from the technician's work chair to the compressed air source, and with the central portion of the air supply hose being supported by the hose support device biased to urge the air hose rearward of the technician's work chair in accordance with the first embodiment.

The positioning of the pneumatically operated pistons 48 of the pneumatic mechanism 46 for height adjustment of the cushion portion 60 is accomplished by operating pneumatic switches 70a and 70b, which are fixed to a first side of the seatback portion 62, as shown in FIGS. 2, 19 and 20. One of the pneumatic switches 70a and 70b allows compressed air from a compressed air source 72 enter the pneumatic mechanism 46, thereby raising the seat cushion portion 60. The other of the pneumatic switches 70a and 70b allows compressed air within the pneumatic mechanism 46 to escape from the pneumatic mechanism 46, thereby lowing the seat cushion portion 60. The compressed air source 72 is shown in FIGS. 25 and 26, and, is described in greater detail below.

Figure 28:
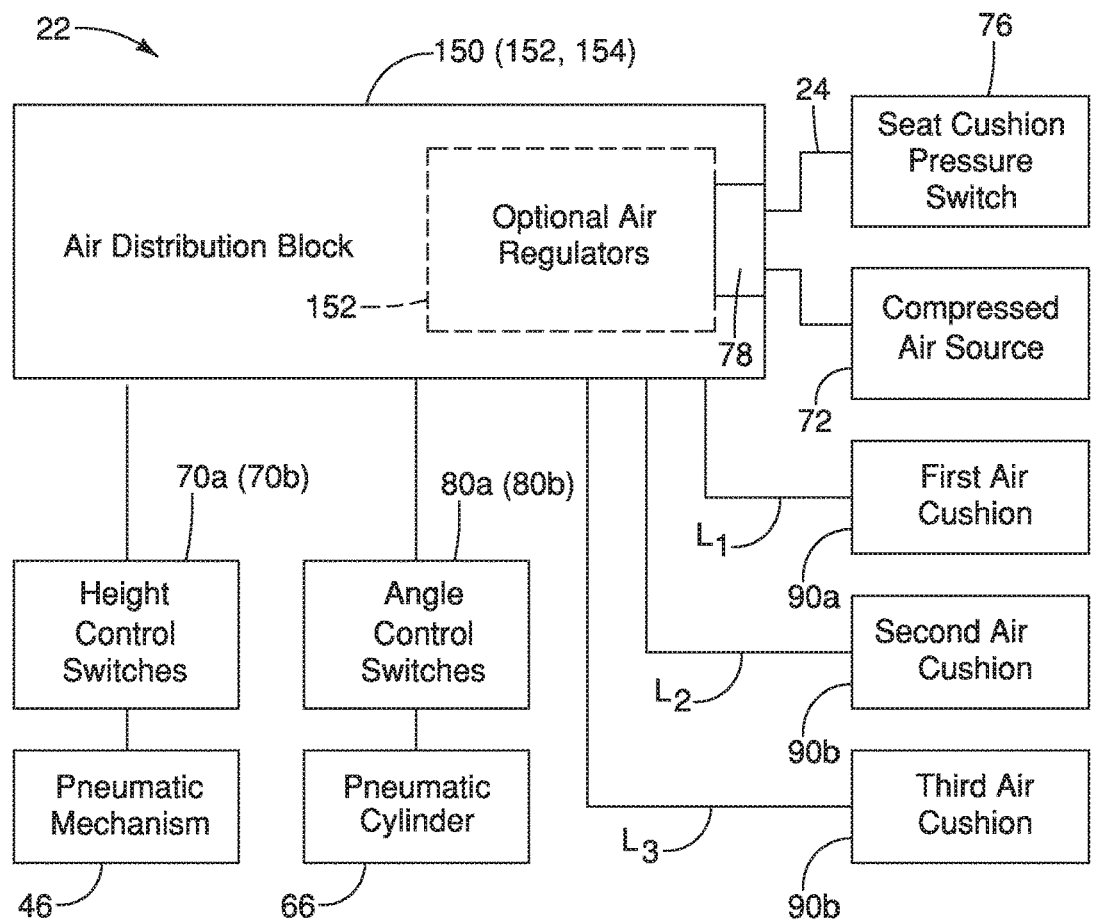
FIG. 28 is a block diagram showing various elements of the air supply distribution system of the technician's work chair in accordance with the first embodiment.

As shown in FIGS. 8, 9 and 28, the cushion portion 60 of the seat assembly 14 also includes a pressure switch 76 that operates a shutoff valve 78 connected to the air hose 24 and the compressed air source 72. The pressure switch 76 is configured such that with the cushion portion 60 being vacant (little or no pressure applied the pressure switch 76), the pressure switch 76 operates the shutoff valve 78 to close, cutting off flow of compressed air to the technician's work chair 10, and more specifically to the air cushion assembly 16, the pneumatic mechanism 46 and the pneumatic cylinder 66. Conversely, with the cushion portion 60 occupied by the technician T (a pressure or force above a predetermined level being applied to the pressure switch 76), the pressure switch 76 operates the shutoff valve 78 to open such that compressed air flows to the technician's work chair 10, and to the air cushion assembly 16, the pneumatic mechanism 46 and the pneumatic cylinder 66.

The seatback portion 62 is supported at the rear section 60r of the cushion portion 60 of the seat assembly 14 by the hinge structure 64, as shown in FIGS. 10, 11 and 12. The hinge structure 64 is fixed to the cushion portion 60 and fixed to the seatback portion such that the seatback portion 62 can pivot freely about the hinge structure relative to the cushion portion 60. A rearward surface of the seatback portion 62 is supported by an upper end of the pneumatic cylinder 66 (also referred to herein below as an inclination adjusting mechanism 66). A lower end of the pneumatic cylinder 66 is fixed to the central plate 34 for vertical positioning therewith. Upper and lower ends of the pneumatic cylinder 66 include pivot structures. The pneumatic cylinder 66 is operable to change an angle or inclination $\alpha_4$ of the seatback portion 62. The angle of inclination $\alpha_4$ can be measured relative to the frame 12 or to a vertical direction $V_D$, as shown in FIGS. 10 and 11. The angle of inclination $\alpha_4$ makes it easier for the technician T (FIG. 24) seated in the seat assembly 14 to more ergonomically operate tools and complete tasks with arms raised over the technician's head working on the underside of the vehicle V (FIG. 24).

The pneumatic cylinder 66 is supplied with compressed air from the air hose 24 and the compressed air source 72, as described in greater detail below. The air pressure from the compressed air source 72 is first directed to a switching mechanism 80 and then to the pneumatic cylinder 66. The switching mechanism 80 is configured to manipulate air pressure within the pneumatic cylinder 66 to change the angle of inclination angle $\alpha_4$ of the seatback portion 62. The switching mechanism 80 is fixed to a second lateral side, of the seatback portion 62, as shown in FIG. 23. The switching mechanism 80 includes a first switch 80a and a second switch 80b.

The positioning of the seatback portion 62 via the pneumatic cylinder 66 is accomplished as follows. When pressed, the first switch 80a allows compressed air within the pneumatic cylinder 66 to escape thereby lowing the seatback portion 62 and increasing the angle of inclination angle $\alpha_4$. The second switch 80b allows compressed air from the compressed air source 72 to enter the pneumatic cylinder 66, thereby raising the seat portion 62 decreasing the angle of inclination angle $\alpha_4$. The compressed air source 72 is shown in FIGS. 25 and 26, and, is described in greater detail below.

A description of the air cushion assembly 16 is now provided with reference to FIGS. 1-4 and 7-18. Air cushion assemblies, such as the air cushion assembly 16, are devices that force air between an upwardly facing surface and a downwardly facing surface. The upwardly facing surface is, for example, a road or floor surface, or the surface of a body of water. The downwardly facing surface is the bottom surface of a movable object, such as a boat or hovercraft. The air forced between the upwardly facing surface and the downwardly facing surface creates boundary layer of air between the two that in effect is a near friction free relationship between the two surfaces. Small amounts of horizontally oriented force (parallel to the upwardly facing surface and the downwardly facing surface) are required to move the movable object. The boundary later of air is sometimes referred to as a cushioning effect.

In the depicted first embodiment, the air cushion assembly 16 is fixedly attached to the frame 12 and includes a first-floor engaging device 90a, a second-floor engaging device 90b and a third-floor engaging device 90c. The first-floor engaging device 90a is fixedly attached to the first forward leg portion 50 proximate a distal end thereof. More specifically, the first-floor engaging device 90a is fixed via mechanical fasteners or welding to the end plate 36. The second-floor engaging device 90b attached to the second forward leg portion 52 proximate a distal end thereof. More specifically, the second-floor engaging device 90b is fixed via mechanical fasteners or welding to the end plate 38. Similarly, the third-floor engaging device 90c is attached to the rearward leg portion 54 proximate or at a distal end thereof. As shown schematically in FIGS. 10-12, the third-floor engaging device 90c is fixed via mechanical fasteners or welding to the end plate 40.

As shown schematically in FIG. 4, the first-floor engaging device 90a and the second-floor engaging device 90b are spaced apart from one another by a first distance $D_1$. The third-floor engaging device 90c is spaced apart from each of the first-floor engaging device 90a, and, the second-floor engaging device 90b, by a second distance $D_2$, the second distance $D_2$ being less that 80 percent of the first distance in FIG. 4, the second distance $D_2$ is approximately 70 percent of the first distance $D_1$.

The first-floor engaging device 90a, the second-floor engaging device 90b and the third-floor engaging device 90c define either a right angle (90 degrees), or more preferably an obtuse angle (greater than 90 degrees) with the third-floor engaging device 90c being a vertex of the obtuse angle. The obtuse angle can be greater than 100 degrees.

The air cushion assembly 16 is supplied with compressed air such that when operating the air cushion assembly 16 creates an air boundary layer along the surface of a floor F. More specifically, each of the first, second and third-floor engaging devices 90a, 90b and 90c are configured to support the frame 12 on the floor surface F with this air boundary layer creating an almost friction free relationship therebetween. Put another way, each of the first, second and third-floor engaging devices 90a, 90b and 90c is configured to support the frame 12 on the floor surface F such that the frame 12 (and the technician's work chair 10) freely glide along the floor surface F.

In the depicted first embodiment, the first-floor engaging device 90a, the second-floor engaging device 90b, and the third-floor engaging device 90c are also referred to as air cushion devices 90a, 90b and 90c and are all identical to one another. Therefore, description of one of the air cushion devices 90a, 90b and 90c (the first-floor engaging device 90a, the second-floor, engaging device 90b, and the third-floor engaging device 90c) applies equally to all.

One of the air cushion devices 90a, 90b and 90c is depicted in FIGS. 13-17 and is described herein below. The air cushion device 90a (90b and 90c) includes an upper end 92 that attaches to the frame 12, a lower end 94, and a mechanical swivel joint 96 located between the upper end 92 and the lower end 94.

The mechanical swivel joint 96 provides the lower end 94 with freedom of movement in response to movement along non-planar surface areas. The mechanical swivel joint 96 can be a conventional ball retained within a spherical socket or a double axel coupling device that allows the lower end 94 freedom of movement. Specifically, the mechanical swivel joint 96 allows the lower end 94 to move relative to a vertical axis in the event the air cushioning device 90a passes over an uneven, or section of the floor F that is not level, thereby maintaining an approximately parallel relationship between the floor F and the underside of the lower end 94 of the air cushion device 90a. In other words, as the technician's work chair 10 is moved along an uneven surface of the floor F, each of the air cushion devices 90a, 90b and 90c can pivot such that the underside of the underside of the lower end 94 of each of the air cushion devices 90a, 90b and 90c can pivot independent of the others. For example, in an ideal environment, where the floor F is perfectly planar and level, the respective undersides of the air cushion devices 90a, 90b and 90c will all be co-planar. However, in reality, most concrete floors are not perfectly level or perfectly flat. Hence, there may be instances where the air cushion devices 90a and 90b are co-planar while interaction with respective level portions the floor F, and, the air cushion device 90c will need to swivel slightly to remain parallel to the floor but will not be co-planar with the air cushion devices 90a and 90b. The swivel joints 96 allow for such movement, maximizing the friction reducing properties of an air boundary layer between the air cushion devices 90a, 90b and 90c as the technician's work chair 10 is moved along uneven sections of the floor F.

Figure 14:
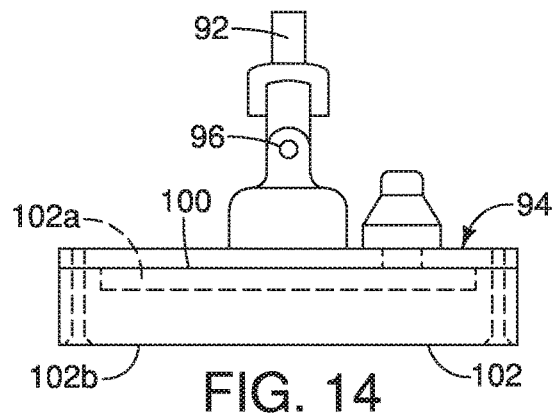
FIG. 14 is a side view of one of the air cushion assemblies shown removed from the frame, showing a housing that includes a circular plate and a chamber plate with a swivel joint and the air-line receiving fitting extending from an upper surface of the circular plate in accordance with the first embodiment.
Figure 15:
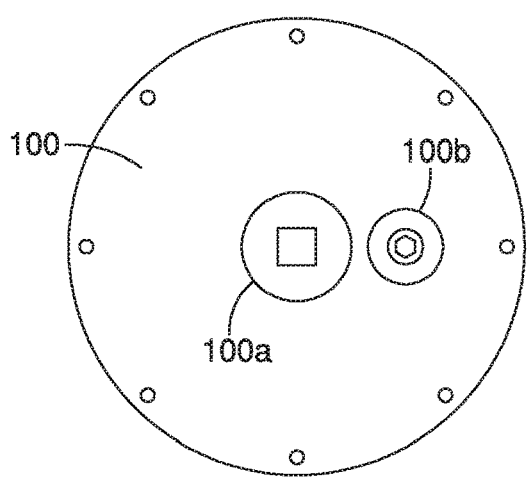
FIG. 15 is a top view of the circular plate of the housing of the air cushion assembly shown in FIG. 14, showing a swivel joint and the air-line receiving fitting in accordance with the first embodiment.
Figure 16:
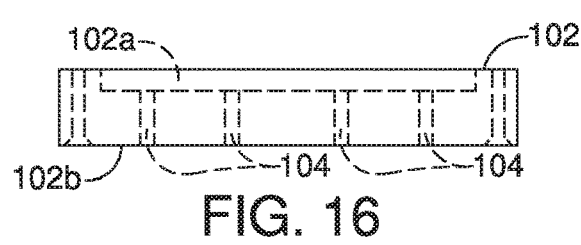
FIG. 16 is a side view of the chamber plate of the housing of the air cushion assembly shown in FIG. 14, showing in phantom a recessed area or chamber with air holes that extend from the chamber to a lower surface of the chamber plate in accordance with the first embodiment.
Figure 17:
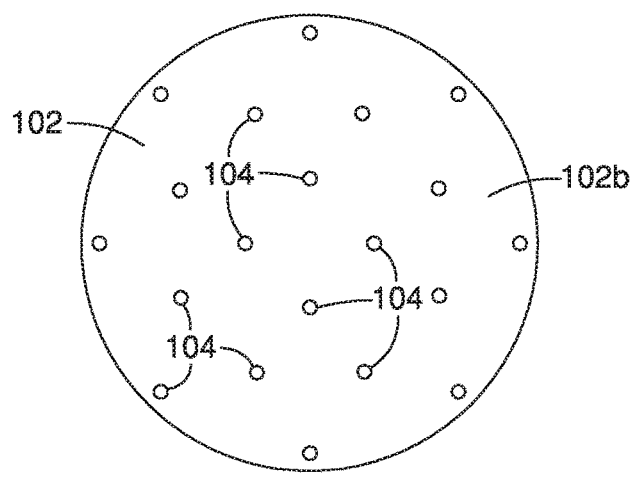
FIG. 17 is a bottom view of the chamber plate showing air holes along the lower surface of the chamber plate in accordance with the first embodiment.
Figure 18:
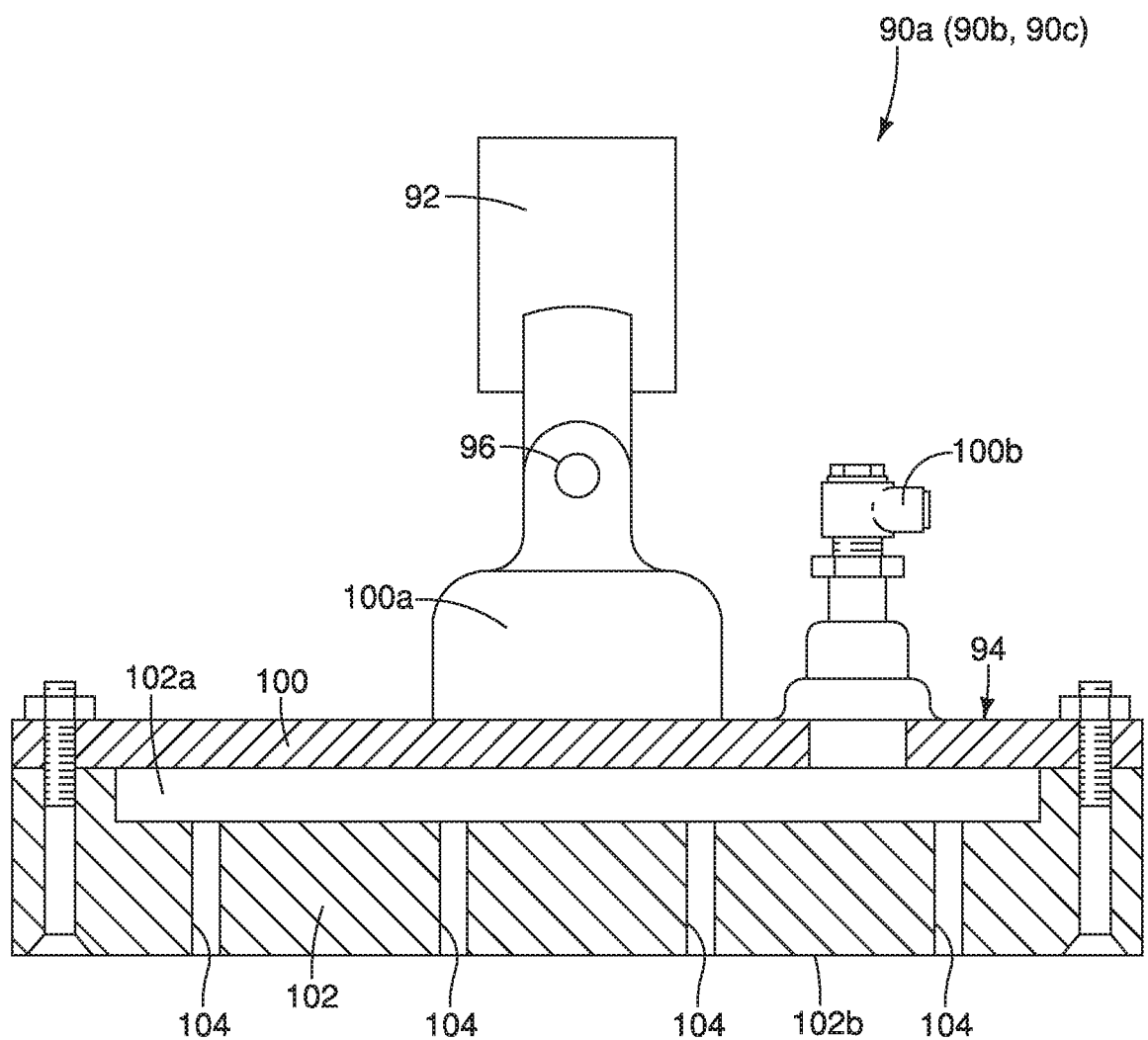
FIG. 18 is a cross-sectional side view of the air cushion assembly showing the chamber and air holes extending to the lower surface of the chamber plate in accordance with the first embodiment.

As shown in FIGS. 14 and 15, the lower end 94 of the air cushion device 90a further includes a housing 98 configured to face the floor F. The housing 98 in the depicted embodiment includes a circular plate 100 and a chamber plate 102. The circular plate 100 has an upper surface having a central fixture 100a that secures a lower end of the swivel joint 94, and, an air-line receiving fitting 100b configured to receive and secure an air-line that supplies compressed air.

The chamber plate 102 has an outer perimeter that surrounds a chamber 102a, As shown in FIGS. 14. 16 and 18, the outer perimeter of the chamber plate 102 includes openings for fasteners that fix the chamber plate 102 to the circular plate 100, sealing the contacting surfaces of the outer perimeter of the chamber plate 102 arid the circular plate 100. The chamber plate 102 includes a centered recessed area 102a that is dimensioned such that when fixed to the circular plate 100 is fixed to the chamber plate 102, the centered recessed area 102a defines a chamber 102a (the centered recessed area 102a). A plurality of air holes 104 are defined in the chamber plate 102 and extend from a lower surface 102b of the chamber plate 102 to the chamber 102a.

In the depicted embodiment, the air cushion device 90a (the first air cushion device) and the air cushion device 90b (the second air cushion device 90b) are supplied with compressed air at a first air pressure. Since the technician T is seated at a central area of the technician's work chair 10, most of the overall mass of both the technician's work chair 10 and the technician T is carried by the air cushion device 90c (the third air cushion device 90c). Therefore, in the first embodiment, the air cushion device 90c is supplied with compressed air at a second air pressure that is greater than the first air pressure.

Figure 21:
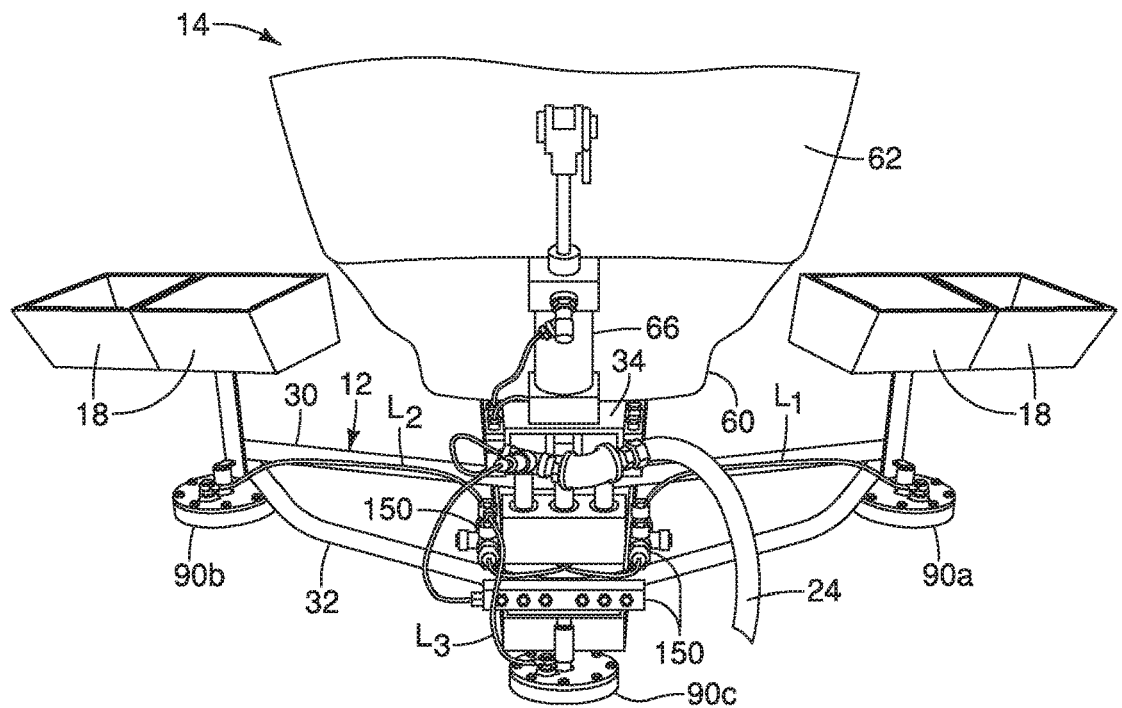
FIG. 21 is a rear view of the fully assembled technician's work chair showing portions of the air distribution system and the air hose that supplies compressed air to the air distribution system in accordance with the first embodiment.

In the first embodiment, the difference between the first and second air pressures is accomplished via differences in the inner diameters of air-lines supplying compressed air to the air cushion assembly 16 (the air cushion device 90a, the air cushion device 90b and the air cushion device 90c). Specifically, as shown in FIG. 21, the first air cushion device 90a and the second air cushion device 90b are supplied with compressed air via first air-lines $L_1$ and $L_2$, each having a first inner diameter, and the third air cushion device 90c is supplied with compressed air via a third air-line $L_3$ having a second inner diameter greater than the first inner diameter. The differences in the respective diameters allows for a greater flow of compressed air the third air cushion device 90c, providing it with a greater air cushioning potential.

As shown in FIG. 24, the technician T sits in the technician's work chair 10, with the technician's work chair 10 floating on three cushions of air provided by the first second and third air cushion devices 90a, 90b and 90c. Consequently, the technician T moves the chair into appropriate positions under the vehicle V using his/her feet with little or no effort clue to the near friction free characteristics provided by the air cushioning effect of the first second and third air cushion devices 90a, 90b and 90c. The technician T uses the technician's work chair 10 to move to various predetermined positions under the vehicle V to install parts and hardware to the underside U of the vehicle V. The technician T uses tools to install the parts and hardware in order to complete assembly line tasks during the manufacture and assembly of the vehicle V.

To further assist the technician T, the technician's work chair 10 is provided with the hardware retaining structures 18a and the tool holders 18b, as shown in FIGS. 1, 2 and 24. Specifically, each side of the frame 12 supports a plurality of the hardware retaining structures 18a. In the depicted embodiment, the hardware retaining structures 18a are bins or trays supplied with predetermined fasteners, hardware and/or parts that are installed by the technician T to the vehicle V. One side of the frame supports a pair of the tool holders 18b. The tool holders 18b are dimensioned to removably retain, for example, electric drills, electric impact guns (for installed staples, rivets or the like) or any other appropriate tool necessary to install parts and hardware to the vehicle V. The tool holders 18b are positioned for easy access for the technician T. The vertical positions of the tool holders 18b are easily adjusted by telescoping vertical masts that also retain portions of the electronic task guiding system 20, described further below.

In the depicted embodiment, the tool holders 18b are positioned just below shoulder height of the technician T, as shown in FIG. 24. The hardware retaining structures 18a (the bins or trays) are positioned at a height proximate the technicians waist line and to one lateral side of the cushion portion 60 of the seat assembly 14.

As shown in FIGS. 1, 2 and 24, a pair of work lights 18c are attached to the seat assembly 14, with one work light 18c being fixed to the seat assembly 14 on a first lateral side thereof and the other work light 18c being fixed to a second lateral side of the seat assembly 14. Each work light 18c is configured for flexible movement for aiming the work light 18c via, for example, a conventional flexible goose neck time extension.

Figure 27:
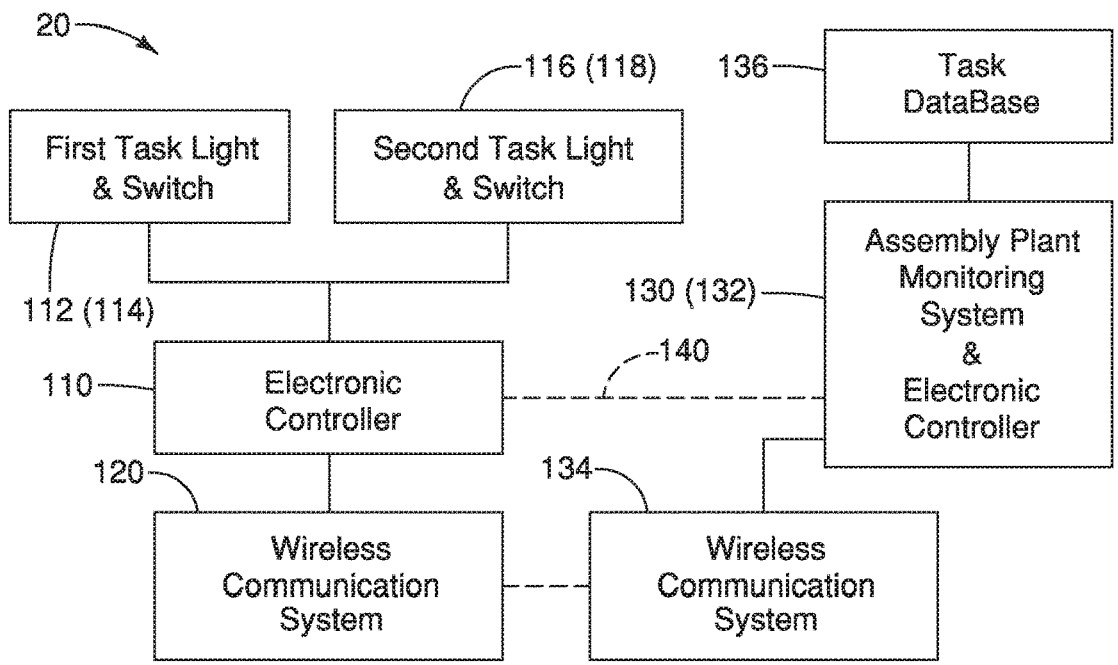
FIG. 27 is a block diagram showing various elements of the electronic task guiding system of the technician's work chair in accordance with the first embodiment.

As shown in FIGS. 1, 2 and 24 the electronic task guiding system 20 is supported to the frame 12 at the first forward leg portion 50, at a first lateral side of the seat assembly 14. The electronic task guiding system 20 is configured to provide the technician T with task related signals. As shown in FIG. 27, in the depicted first embodiment, the electronic task guiding system 20 includes an electronic controller 110, a first task light 112, a first task switch 114, a second task light 116, a second task switch 118 and a wireless communication system 120 (FIG. 27 only).

The first task light 112 and the second task light 116 can be any of a variety of illuminating devices, such as a light bulb or LED (light emitting diode) in a housing. The first task 114 and the second task switch 118 can be mechanical switches or touch screen displays, or a touch sensitive contact switch that is easily operated or contacted by the technician T.

During operation of the vehicle assembly line with the technician T is seated in the technician's work chair 10 installing parts and/or hardware to the underside U of the vehicle V in FIG. 24, the first task light 112 illuminates indicating a predetermined task is to be performed. When the task is completed, the technician T operates or touches the first task switch 114 providing an indication that the task has been performed and is completed. The second task light 116 can thereafter illuminate indicating a second predetermined task is to be performed. When the second task is completed, the technician T operates or touches the second task switch 118 providing an indication that the task has been performed and is completed. This signaling system repeats until all predetermined tasks are completed. Alternatively, other signals can be provided, such as blinking of the first and/or second task light 112 and 116 providing different information.

The electronic task guiding system 20 can be a stand alone system, programmed to provide the task related information via operation of each of the first task light 112 and the second task light 116, and further programmed to respond to operation of the first task switch 114 and the second task switch 118. Alternatively, as shown in FIG. 27, the electronic task guiding system 20 can be in communication with a separate assembly plant monitoring system 130, with its own electronic controller 132 and wireless communication system 134. The assembly plant monitoring system 130 includes a task database 136 with data relating to many or all operations and tasks conducted within the vehicle assembly line. As shown in FIG. 27, the electronic controller 110 of the electronic task guiding system 20 can be hardwired via line 140 to the electronic controller 132 of the assembly plant monitoring system 130. Alternatively, the electronic controller 110 and the electronic controller 132 at assembly plant monitoring system 130 can communicate with one another via the wireless communication systems 120 and 134. Still further, the first task light 112, the first task switch 114, the second task light 116 and the second task switch 118 can be simple lights and switches that are hardwired to a remote assembly plant monitoring system 130 or other such controller. The wires to each of the first task light 112, the first task switch 114, the second task light 116 and the second task switch 118 can be wrapped up with the air hose 24, such that the air hose 24 and the wires define a coiled snake that is protected by an outer sleeve (not shown).

Consequently, in response to the technician T operating either one of the task switches 114 and/or 118, the electronic controller 110 of the electronic task guiding system 20 can send a signal to the electronic controller 132 of the assembly plant monitoring system 130 that indicates completion of specific tasks.

Figure 22:
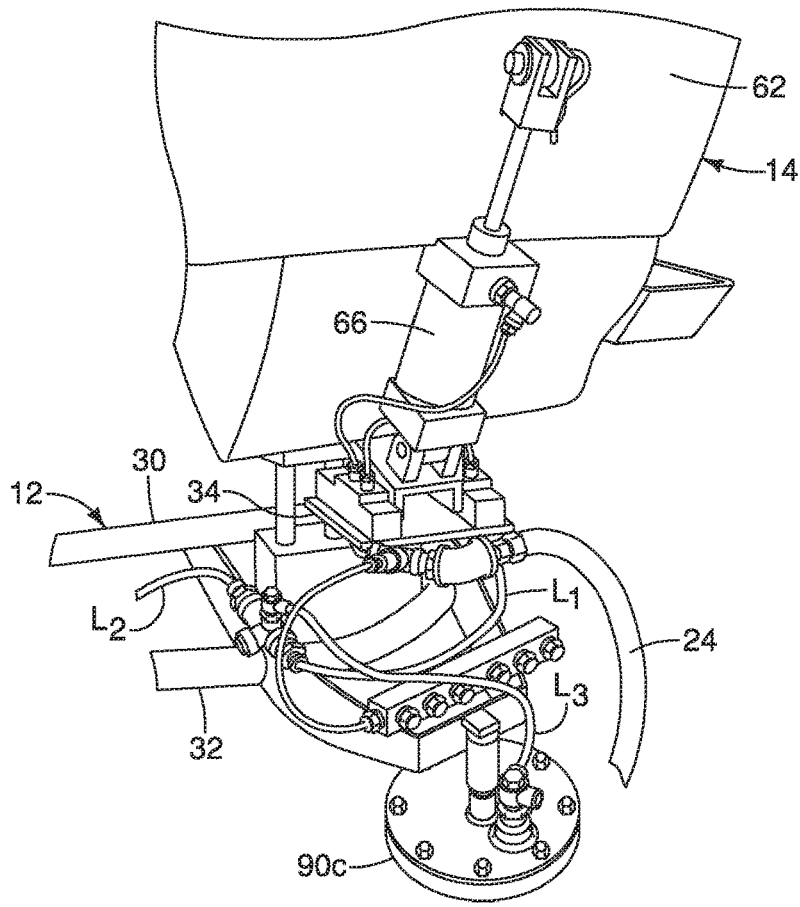
FIG. 22 is a perspective rear view of a portion of the rear of the fully assembled technician's work chair showing further portions of the air distribution system and the air hose that supplies compressed air to the air distribution system in accordance with the first embodiment.

A description of the air supply distribution system 22 and the air supply hose 24 is now provided with reference to FIGS. 21, 22 and 28. The air supply distribution system 22 includes air distribution blocks 150, as shown in FIGS. 21 and 22. In FIG. 28, for purposes of simplicity, only a single air distribution block 150 is schematically shown. As shown in FIG. 28, the air supply distribution system 22 also includes the pneumatic mechanism 46, the pneumatic switches 70a and 70b (height control switches), the pneumatic cylinder 66, the switching mechanism 80 with the first switch 80a and the second switch 80b (angle control switches), the compressed air source 72, the shutoff valve 78 and the first, second and third air cushions 90a, 90b and 90c. As is also shown in FIG. 28, the air supply distribution system 22 can also include optional air regulators 152 in order to control pressure levels of compressed air supplied to the various elements of the air supply distribution system 22.

The air distribution block 150 is supplied with compressed air from the compressed air source 72. The compressed air source 72, for example, an air compressor and associated tank configured to retain compressed air produced by the air compressor in a conventional manner. The compressed air source 72 is connected to the air distribution block 150 be the air supply hose 24. The shutoff switch 78 is connected to the air supply hose 24 and is located upstream of or within the air distribution block 150. As described above, the pressure switch 76 within the cushion portion 60 of the seat assembly 14 automatically opens the shutoff switch 78 allowing compressed air to flow into the air distribution block 150 in response to the technician T sitting out the cushion portion 60.

The pneumatic switches 70a and 70b, the pneumatic mechanism 46, the pneumatic cylinder 66, the switching mechanism 80 with the first switch 80a and the second switch 80b and the first, second and third air cushions 90a, 90b and 90c are all supplied with compressed air from the air distribution block 150.

The optional air regulators 152 or optional air regulator 152 can be adjusted such that the first air cushion device 90a and the second air cushion device 90b are supplied with compressed air at a first air pressure, and the third air cushion device 90c is supplied with compressed air at a second air pressure, the second air pressure being greater than the first air pressure.

A description of the air supply hose 24 (aka air hose 24) and the hose support device 26 is now provided with specific reference to FIGS. 25 and 26. The air hose 24 has a first end 24a connected to the compressed air source 26 and a second end 24b connected to the air supply distribution system 22 supplying compressed air thereto. T The hose support device 26 is a pivoting device that includes a vertical shaft 160 non-movably fixed to the floor surface F, a gate 162 and a biasing member 164.

The vertical shaft 160 is non-movably fixed to the floor surface F. The gate 162 is installed with bearings or lubricated bearing surfaces (not shown) to the vertical shaft 160. Consequently, the gate 162 can freely pivot about the vertical shaft 160. The gate 162 has a cantilevered support arm 162a that extends radially outward from the vertical shaft 160. The biasing member 164 has a first end connected to a portion of the support arm 162a spaced apart from the vertical shaft 160 and a second end fixed to a rigid wall or post 166. The positioning of the post 166, the vertical shaft 160, the gate 162 and the biasing member 164 is such that the biasing member 164 biases the gate 162 to move away from the technician's work chair 10 and out of a path that vehicles V move along in the assembly line. A mid-section of the air hose 24 is supported at a distal end of the support arm 162a above the floor surface F. Consequently, the biasing member 164 biases the technician's work chair 10 to move in a rearward direction relative to the technician's work chair 10.

The technician's work chair 10 provides the technician T with a comfortable seating area (the seat assembly 14) that can be raised and lowered, and, provided with an angle of inclination that allows the technician 1 to perform various tasks under the vehicle V, as show in FIG. 24. The technician's work chair 10 is ergonomic and practical. The hardware retaining structures 18a provide easy access to parts and fastener. The tool holders 18b provide convenient access to the tools necessary to install the parts and fasteners to the vehicle V. As well, the goosenecks of the work lights 18c make it simple to aim the work lights 18c in areas relative to the technician's work chair 10 thereby illuminating an underside of the vehicle V.

Second Embodiment

Figure 29:
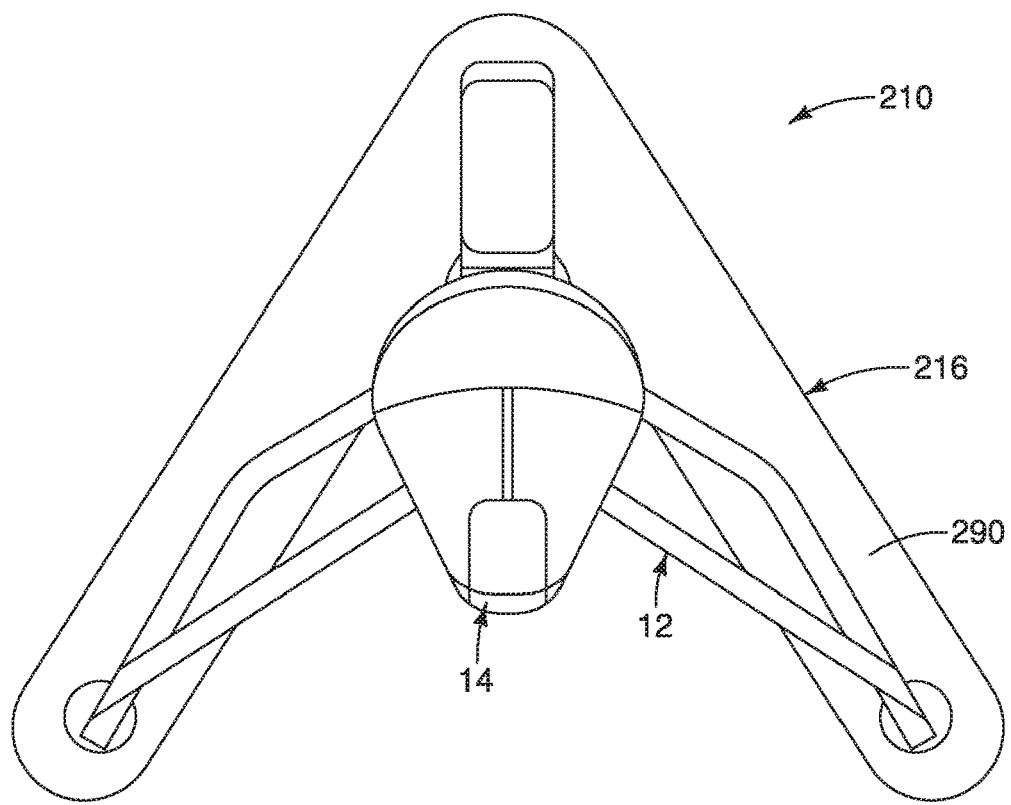
FIG. 29 is a top view of a technician's work chair in accordance with a second embodiment.

Referring now to FIG. 29, a technician's work chair 210 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the marts of the first embodiment may be omitted for the sake of brevity.

The technician's work chair 210 includes all the features of the technician's work chair 10 of the first embodiment, such as the frame 12, the seat assembly 14, etc. The only difference between the technician's work chair 10 of the first embodiment and the technician's work chair 210 of the second embodiment is a change to the air cushion assembly 16. Specifically, the first-floor engaging device 99a (air cushion device 90a), the second-floor engaging device 90b (air cushion device 90b) and the third-floor engaging device 90c of the an cushion assembly 16 of the first embodiment have been replaced with a single air cushion device 290. In other words, the air cushion assembly 216 of the second embodiment includes a single air cushion device 290 having an overall V-shape, as shown in FIG. 29. The two legs of the overall V-shape extends outward alone opposite lateral side of the seat assembly 14 and frame 12.

As in the first embodiment, the single air cushion device 290 of the air cushion assembly 216 has a plurality of air holes (not shown) that release compressed air forming an air cushion between the floor F and the underside of the single air cushion device 290, providing a near friction free support to the technician's work chair 210 such that the technician's work chair 210 glides freely and smoothly along the floor F.

Third Embodiment

Figure 30:
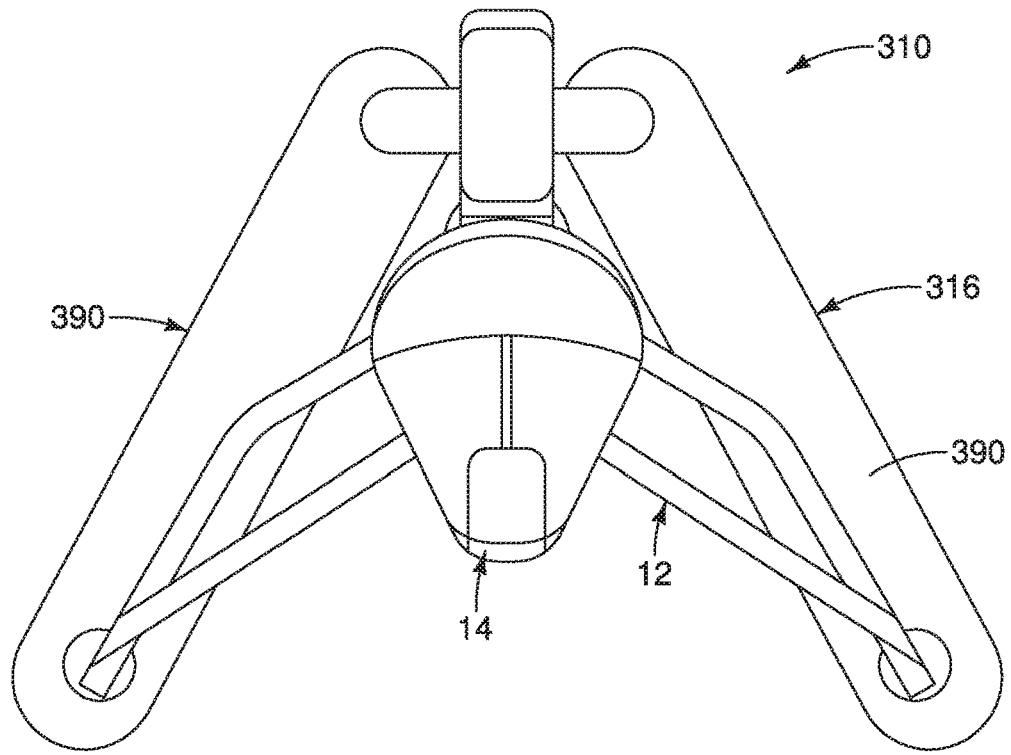
FIG. 30 is a top view of a technician's work chair in accordance with a third embodiment.

Referring now to FIG. 30, a technician's work chair 310 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The technician's work chair 310 includes all the features of the technician's work chair 10 of the first embodiment, such as the frame 12, the seat assembly 14, etc. The only difference between the technician's work chair 310 of the first embodiment and the technician's work chair 310 of the thud embodiment is a change to the air cushion assembly 16. Specifically, the first-floor engaging device 90a (air cushion device 90a), the second-floor engaging device 90b (air cushion device 90b) and the third-floor engaging device 90c of the air cushion assembly 16 of the first embodiment have been replaced with two an cushion device 390. In other words, the air cushion assembly 316 of the third embodiment includes two air cushion device 290, as shown in FIG. 30. The two air cushion devices 390 extend outward along opposite lateral side of the seat assembly 14 and frame 12.

As in the first embodiment, the two air cushion devices 390 of the an cushion assembly 316 has a plurality of air holes (not shown) that release compressed air forming an air cushion between the floor F and the wider side of each of the two air cushion device 390 providing a near friction free support to the technician's work chair 310 such that the technician's work chair 310 glides freely and smoothly along the floor F.

Fourth Embodiment

Figure 31:
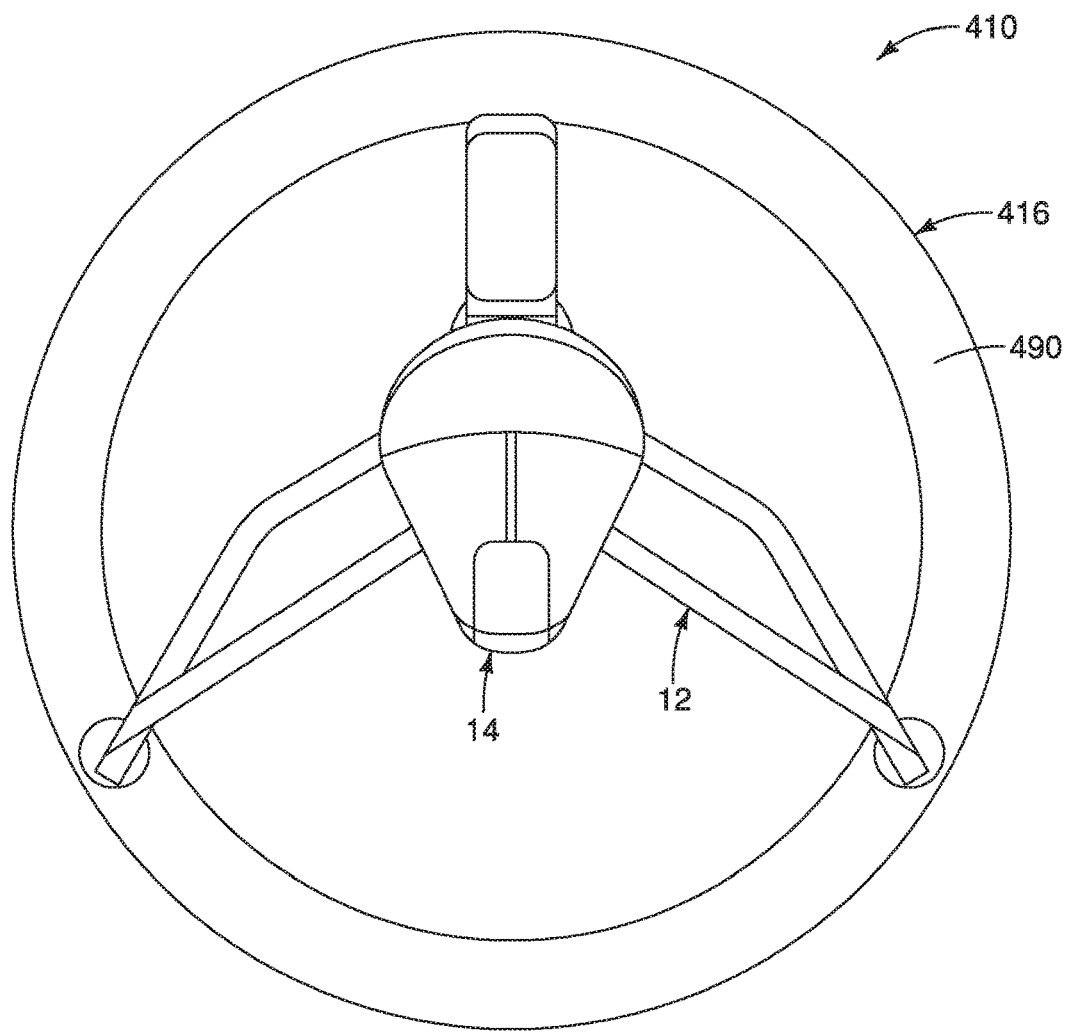
FIG. 31 is a top view of a technician's work chair in accordance with a fourth embodiment.

Referring now to FIG. 31, a technician's work chair 410 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The technician's work chair 410 includes all the features of the technician's work chair 10 of the first embodiment, such as the frame 12, the seal assembly 14, etc. The only difference between the technician's work chair 10 of the first embodiment and the technician's work chair 410 of the fourth embodiment is a change to the air cushion assembly 16. Specifically, the first-floor engaging device 90a (air cushion device 90a), the second-floor engaging device 90b (air cushion device 90b) and the third-floor engaging device 90c of the air cushion assembly 16 of the first embodiment have been replaced with a single air cushion device 490. In other words, the air cushion assembly 416 of the second embodiment includes a single air cushion device 490 having a circular shape, or annular shape, as shown in FIG. 31. The single air cushion device 490 basically encircles the frame 12 with an open area located beneath the frame 12 and the seat assembly 14. The open area at the center of the air cushion device 490 is dimensioned such that the feet of the technician T can freely engage the floor in order to move the technician's work chair 410.

As in the first embodiment, the single air cushion device 490 of the air cushion assembly 416 has a plurality of air holes (not shown) that release compressed air forming an air cushion between the floor F and the underside of the single air cushion device 490, providing a near friction free support to the technician's work chair 410 such that the technician's work chair 410 glides freely and smoothly along the floor F.

Fifth Embodiment

Figure 32:
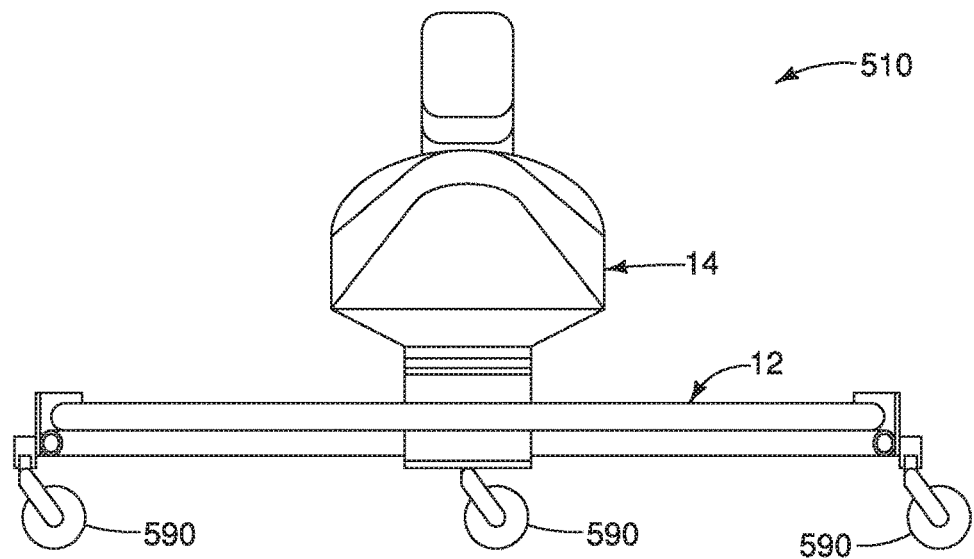
FIG. 32 is a top view of a technician's work chair in accordance with a fifth embodiment.

Referring now to FIG. 32, a technician's work chair 510 in accordance with a fifth embodiment will now be explained. In view of the similarity between the first and fifth embodiments, the parts of the fifth embodiment that are identical to the parts of the fifth embodiment will be given the same reference numerals as the parts of the first embodiment. Moreover, the descriptions of the parts of the fifth embodiment that are identical to the parts of the first embodiment may be omitted for the sake of brevity.

The technician's work chair 510 includes all the features of the technician's work chair 10 of the first embodiment, such as the frame 12, the seat assembly 14, etc. The only difference between the technician's work chair 10 of the first embodiment and the technician's work chair 510 of the fifth embodiment is that the air cushion assembly 16 is eliminated. Specifically, the first-floor engaging device 90*a* (air cushion device 90*a*) is replaced with one of a plurality of casters 590, the second-floor engaging device 90*b* (air cushion device 90*b*) is replaced with a caster 590 and the third-floor engaging device 90*c* of the air cushion assembly 16 of the first embodiment have been replaced with another caster 590.

Each of the casters 590 is basically is a rotatable and swivel-able wheel structure that contact the floor surface F. The casters 590 provide a low friction support to the technician's work chair 510 such that the technician's work chair 510 glides smoothly along the floor F.

The electronic controllers 110 and 130 preferably includes a microcomputer with an assembly line task control program that controls and/or manages the tasks performed by one or more stations within a vehicle assembly line, as discussed below. The electronic controllers 110 and 130 can also include other conventional components such as an input interface circuit, an output interface circuit, and storage devices such as a ROM (Read Only Memory) device and a RAM (Random Access Memory) device. The microcomputer of the electronic controllers 110 and 130 is programmed to control and or monitor various assembly stations along a vehicle assembly line. The electronic controllers 110 and 130 are operatively coupled to the electronic task guiding system 20 of the technician's work chair 10, as well as equipment in other assembly stations along the vehicle assembly line, in a conventional manner. The internal RAM of the electronic controllers 110 and 130 stores statuses of operational flags and various control data. The internal ROM of the electronic controllers 110 and 130 stores task information for various operations. The electronic controllers 110 and 130 are capable of selective controlling any of the components of the control system in accordance with the control program. It will be apparent to those skilled in the art from this disclosure that the precise structure and algorithms for the electronic controllers 110 and 130 can be any combination of hardware and software that will carry out the functions of the present invention.

The various vehicle elements, parts, hardware and components are conventional components that are well known in the art. Since the various vehicle elements, parts, hardware and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the technician's work chair 10. Accordingly, these terms, as utilized to describe the present invention should be interpreted relative to a vehicle equipped with the technician's work chair 10.

The term "detect" as used herein to describe an operation or function carried out by a component, a section, a device or the like includes a component, a section, a device or the like that docs not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further in by the applicant, including the structural and/or functional concepts embodied by such features. Thus, the foregoing descriptions of the embodiments according to the present invention rare provided for illustration only, and not for the purpose of limiting the invention as defined by the appended claims and their equivalents.

What is claimed is:

1. A technician's work chair comprising:
   a frame having a first forward leg portion, a second forward leg portion and a rearward leg portion, the frame further having, a seat supporting portion located proximate the rearward leg portion and extending at least partially over the rearward leg portion, a tool supporting portion and a hardware supporting portion installed to the frame proximate one of the first forward leg portion or the second forward leg portion, the first forward leg portion extending forward from the seat supporting portion, the second forward leg portion extending forward from the seat supporting portion such that the first forward leg portion and the second forward leg portion define an angle therebetween that is an obtuse angle $\alpha_1$ greater than 100 degrees;

a first air cushion device attached to the first forward leg portion proximate a distal end thereof;

a second air cushion device attached to the second forward leg portion proximate a distal end thereof;

a third air cushion device attached to the rearward leg portion proximate a distal end thereof, each of the first air cushion device, the second air cushion device and the third air cushion device being spaced apart from one another and being supplied with compressed air; and a seat assembly having a cushion portion and a seatback portion, the cushion portion being attached to the seat supporting portion of the frame and the seatback portion having an inclination adjusting mechanism operable to change an angle of inclination of the seatback portion relative to the frame such that a technician seated in the seat assembly ergonomically operates tools and completes tasks with arms raised over the technician's head, the seat assembly and the frame being positioned such that a forward most portion of the cushion portion is located rearward of the first forward leg portion and the second forward leg portion, the cushion portion being cantilevered in a forward direction from the seat supporting portion of the frame; wherein the frame, the seat assembly and the air cushion assembly are dimensioned and configured such that with the technician seated in the seat assembly the technician's feet freely engage the floor surface in order to move the frame and the seat assembly using his/her feet with little or no effort due to near friction free characteristics provided by the air cushion assembly, and wherein the technician's feet engage the floor at a location that is between respective distal ends of the first forward leg portion and the second forward leg portion.

2. The technician's work chair according to claim 1, further comprising an electronic task guiding system attached to the frame, the electronic task guiding system being configured to provide the technician with task related signals, and wherein the electronic task guiding system includes a communication link to an assembly plant monitoring system, the link being one of a wireless communication device or a direct wired connection.

3. The technician's work chair according to claim 2, wherein the electronic task guiding system includes an electronic controller and at least one light with a task switch, the light being illuminated in response to determining that the technician has started performing a specific task, and in response to the technician operating the task switch, the electronic controller of the electronic task guiding system sends a signal to the assembly plant monitoring system that indicates completion of the specific task.

4. The technician's work chair according to claim 1, wherein the seat assembly includes at least one work light attached thereto that is configured for flexible movement in order to aim the at least one work light.

5. The technician's work chair according to claim 1, wherein the tool supporting portion includes at least one bracket dimensioned and positioned to removably retain an electric tool retained therein such that the at least one bracket positions the electric tool at a height above the cushion portion of the seat assembly and to one side of the seat assembly, and the hardware supporting portion includes at least one hardware bin adjacent to the tool supporting portion, the at least one of a hardware bin being installed to the frame such that the technician can retrieve a corresponding one of hardware or a part therefrom for installation to an underside of a vehicle, the at least one hardware bin being at a height located proximate the technicians waist line and to one lateral side of the cushion portion of the seat assembly.

6. The technician's work chair according to claim 1, wherein the first air cushion device and the second air cushion device are spaced apart from one another by a first distance, the first air cushion device and the second air cushion device both being spaced apart from the third air cushion device by a second distance, the second distance being less that 80 percent of the first distance.

7. The technician's work chair according to claim 1, wherein the cushion portion of the seat assembly extends in a forward direction relative to the frame and is supported to the seat supporting portion of the frame via a pneumatic mechanism that is operated for height adjustment of the cushion portion by mechanical switches that control amounts of compressed air from a compressed air source.

8. The technician's work chair according to claim 1, wherein the inclination adjusting mechanism of the seatback portion of the seat assembly includes a pneumatic cylinder supplied with compressed in from a compressed air source, the pneumatic cylinder being connected to a switching mechanism configured to manipulate air pressure within the pneumatic cylinder to change an angle of inclination of the seatback portion.

9. A technician's work chair comprising:

a frame having a plurality of leg portions, a seat supporting portion, a tool supporting portion and a hardware supporting portion installed to the frame, the frame having a V-shape as viewed from above;

a plurality of air cushion devices, each of the plurality of air cushion devices being attached to a corresponding one of the plurality of leg portions of the frame, each of the plurality of air cushion devices being supplied with compressed air;

a seat assembly having a cushion portion and a seatback portion, the cushion portion being supported to the seat supporting portion of the frame and the seatback portion having an inclination adjusting mechanism operable to change an angle of inclination of the seatback portion relative to the frame such that a technician seated in the seat assembly ergonomically operates tools and completes tasks with arms raised over the technician's head;

a work light attached to the seat assembly that is configured for flexible movement for aiming the work light; and at least one hardware bin fixed to the frame such that the technician can retrieve hardware or a part therefrom for installation to an underside of a vehicle, the plurality of air cushion portions including a first air cushion device attached to the frame at a location forward of and to a first side of the seat assembly, a second air cushion device attached to the frame at a location forward of and a second side of the seat assembly, and a third air cushion device attached to frame below the seat supporting portion below the seat assembly, each of the first air cushion device, the second air cushion device and the third air cushion device being spaced apart from one another and each being supplied with compressed air from a compressed air source, wherein the frame having the V-shape, the seat assembly and the plurality of air cushion devices are dimensioned and configured such that with the technician seated in the seat assembly the technician's feet freely engage the floor surface in order to move the frame and seat assembly using his/her feet with little or no effort due to near friction free characteristics provided by the plurality of air cushion devices, and wherein the technician's feet engage the floor at a location that is within a space defined by the V-shape of the frame.

10. The technician's work chair according to claim 9, wherein the plurality of leg portions including a first forward leg portion, a second forward leg portion and a rearward leg portion, the frame further having, a seat supporting portion located proximate the rearward leg portion, a tool supporting portion and a hardware supporting portion installed to the frame proximate one of the first forward leg portion or the second forward leg portion.

11. The technician's work chair according to claim 10, wherein the first air cushion device is attached to the first forward leg portion proximate a distal end thereof, the second air cushion device is attached to the second forward leg portion proximate a distal end thereof, and the third air cushion device is attached to the rearward leg portion proximate a distal end thereof.

12. The technician's work chair according to claim 11, wherein the cushion portion of the seat assembly is a saddle style seat with a rear section and a forward section, the rear section having a first width and the forward section having a second width, the first width being greater than the second width, the forward section of the seat assembly being cantilevered forward from the seat supporting portion of the frame.

13. The technician's work chair according to claim 12, wherein the seatback portion is inclined rearward from the cushion portion, an angle of inclination of the seatback portion being adjusted via a pneumatic cylinder operated by a pair of mechanical switches installed to one side of the seatback portion, and the cushion portion of the seat assembly is supported to the seat supporting portion of the frame via a pneumatic mechanism that is operated for height adjustment of the cushion portion by mechanical switches that control amounts of compressed air from the compressed air source.

14. The technician's work chair according to claim 13, wherein the cushion portion of the seat assembly includes a pressure switch that operates a shutoff valve connected to the compressed air source such that with the cushion portion being vacant, the pressure switch operates the shutoff valve to close, cutting off flow of compressed air to at least the first air cushion device, the second air cushion device, the third air cushion device, the pneumatic mechanism and the pneumatic cylinder, and with the cushion portion occupied by the technician, the pressure switch operates the shutoff valve to open such that compressed air flows to at least the first air cushion device, the second air cushion device and the third air cushion device, the third air cushion device, the pneumatic mechanism and the pneumatic cylinder.

15. The technician's work chair according to claim 11, wherein the first air cushion device and the second air cushion device are supplied with compressed air at a first air pressure, and the third air cushion device is supplied with compressed air at a second air pressure, the second air pressure being greater than the first air pressure.

16. The technician's work chair accordion to claim 11, wherein the first air cushion device and the second air cushion device are supplied with compressed air via an air line having a first diameter, and the third air cushion device is supplied with compressed air via an air line having a second diameter greater than the first diameter.

17. The technician's work chair according to claim 11, further comprising an air pressure regulator installed to the frame between the compressed air source and the first, second and third air cushion devices such that the first air cushion device and the second air cushion device are supplied with compressed air at a first air pressure, and the third air cushion device is supplied with compressed air at a second air pressure, the second air pressure being greater than the first air pressure.

18. The technician's work chair according to claim 9, wherein the frame further has an electronic task guiding system installed thereto at a lateral side of the seat assembly, the electronic task guiding system includes a communication link to an assembly plant monitoring system and a technician signal mechanism, the link being one of a wireless communication device or a direct wired connection.

19. The technician's work chair according to claim 18, wherein the electronic task guiding system further includes an electronic controller and the technician signal mechanism includes at least one light with a task switch, the light being illuminated in response to determining that the technician has started performing a specific task, and in response to the technician operating the task switch, the electronic controller of the electronic task guiding system sends a signal to the assembly plant monitoring system that indicates completion of the specific task.

20. A technician's work chair comprising:

a frame having a first forward leg portion, a second forward leg portion and a rearward leg portion, the first forward leg portion and the second forward leg portion defining a V-shape as viewed from above, the frame further having, a seat supporting portion located proximate the rearward leg portion, a tool supporting portion and a hardware supporting portion installed to the frame proximate one of the first forward leg portion or the second forward leg portion, the first forward leg portion extending forward from the seat supporting portion, the second forward leg portion extending forward from the seat supporting portion and the rearward leg portion extending rearward away from the first and second forward leg portions, with a distal end of the first forward leg portion being spaced apart from a distal end of the second forward leg portion;

a first swivel joint attached to the distal end of the first forward leg portion;

a second swivel joint attached to the distal end of the second forward leg portion;

a third swivel joint attached to the distal end of the rearward leg portion;

a first air cushion device attached to first swivel joint;

a second air cushion device attached to the second swivel joint;

a third air cushion device attached to the third swivel joint such that each of the first, second and third air cushion devices has freedom of movement in response to movement along a non-planar surface, each of the first, second and third air cushion devices being supplied with compressed air; and a seat assembly having a cushion portion and a seatback portion, the cushion portion being attached to the seat supporting portion of the frame and the seatback portion having an inclination adjusting mechanism operable to change an angle of inclination of the seatback portion relative to the frame such that a technician seated in the seat assembly ergonomically operates tools and completes tasks with arms raised over the technician's head, the seat assembly and the frame being positioned such that a forward most portion of the cushion portion is located rearward of the first forward leg portion and the second forward leg portion such that the technician's feet freely contact the floor within a space defined between the first and second forward leg portions within the V-shape, the cushion portion being cantilevered in a forward direction from the seat supporting portion of the frame.

\* \* \* \* \*